United States Patent [19]
Suzuki et al.

[11] Patent Number: 5,995,309
[45] Date of Patent: Nov. 30, 1999

[54] MAGNETIC RECORDING MEDIUM

[75] Inventors: Shigehisa Suzuki; Tatsuya Fukami; Yoshio Fujii; Yuji Kawano; Yoshinobu Maeda, all of Amagasaki, Japan

[73] Assignee: Mitsubishi Denki Kabushiki Kaisha, Tokyo, Japan

[21] Appl. No.: 08/880,167

[22] Filed: Jun. 20, 1997

Related U.S. Application Data

[62] Division of application No. 08/506,871, Jul. 25, 1995, Pat. No. 5,703,733.

[30] Foreign Application Priority Data

Mar. 6, 1995 [JP] Japan ........................... 7-45523

[51] Int. Cl.⁶ .............. G11B 5/58; G11B 5/596; G11B 5/02
[52] U.S. Cl. .............. 360/55; 360/131; 360/77.07; 360/77.01
[58] Field of Search ................ 428/694 BR, 694 BN, 428/694 BP, 694 R; 360/131, 135, 77.07, 55, 77.01, 77.08, 77.03, 77.06

[56] References Cited

U.S. PATENT DOCUMENTS

| | | |
|---|---|---|
| 3,569,636 | 3/1971 | Schuller . |
| 3,869,711 | 3/1975 | Bernard et al. . |
| 3,878,411 | 4/1975 | Nocito et al. . |
| 4,021,728 | 5/1977 | Makino et al. . |
| 4,344,153 | 8/1982 | Nishida et al. ............ 365/39 |
| 4,535,369 | 8/1985 | Sawazaki . |
| 4,639,906 | 1/1987 | Goto . |
| 4,914,626 | 4/1990 | Thiele ........................ 365/39 |
| 5,051,970 | 9/1991 | Ishii et al. .................. 369/13 |
| 5,055,951 | 10/1991 | Behr . |
| 5,074,929 | 12/1991 | Bradley et al. . |
| 5,289,122 | 2/1994 | Shigeno . |
| 5,296,995 | 3/1994 | Yonezawa et al. . |
| 5,359,287 | 10/1994 | Watanabe et al. . |
| 5,450,009 | 9/1995 | Murakami . |
| 5,512,822 | 4/1996 | Masuda . |
| 5,703,733 | 12/1997 | Suzuki et al. ............ 360/77.01 |

FOREIGN PATENT DOCUMENTS

| | | |
|---|---|---|
| 49-77615 | 7/1974 | Japan . |
| 55-033677A | 3/1980 | Japan . |
| 56-118612A | 9/1981 | Japan . |
| 56-118613A | 9/1981 | Japan . |
| 56-145536A | 11/1981 | Japan . |
| 58-100216A | 6/1983 | Japan . |
| 58-100217A | 6/1983 | Japan . |
| 63-268671A | 11/1988 | Japan . |
| 2-176885A | 7/1990 | Japan . |
| 2-219456A | 9/1990 | Japan . |
| 2-298802A | 12/1990 | Japan . |
| 3-014276A | 1/1991 | Japan . |
| 4-273390A | 9/1992 | Japan . |
| 4-282481A | 10/1992 | Japan . |
| 5-332703A | 12/1993 | Japan . |

OTHER PUBLICATIONS

K. Watanabe et al., "Demonstration of Track Following Technic Based on Discrete Track Media", Sony Corporation, Corporate Research Laboratories, Japan, pp. FD–10.

M. Futamoto et al., "Investigation of 2 Gb/in² Magnetic Recording at a Track Density of 17 kTPI", *IEEE Trans. On Magnetics*, vol. 27, No. 6, Nov. 1991, pp. 5280–5285.

D. Dericotte, "Pre–Embossed Rigid Magnetic (PERM) Disk", Japanese Association of Promoting Science, 144th Committee of Magnetic Recording, No. 104, Nov. 25, 1993.

*Primary Examiner*—Alan Faber
*Attorney, Agent, or Firm*—Burns, Doane, Swecker & Mathis, LLP

[57] ABSTRACT

A method for magnetically recording/reproducing comprising recording an information signal by forming a pattern of a soft magnetic material in a magnetic recording medium; providing a magnetoeletric converting element in a place neighboring a face of forming the pattern of the magnetic recording medium on which the pattern is formed, applying a magnetic field to the pattern; and reproducing the information by detecting a variation of the magnetic field caused by the pattern of the soft magnetic material of the magnetic recording medium while relatively moving the magnetoelectric converting element and the magnetic recording medium.

8 Claims, 18 Drawing Sheets

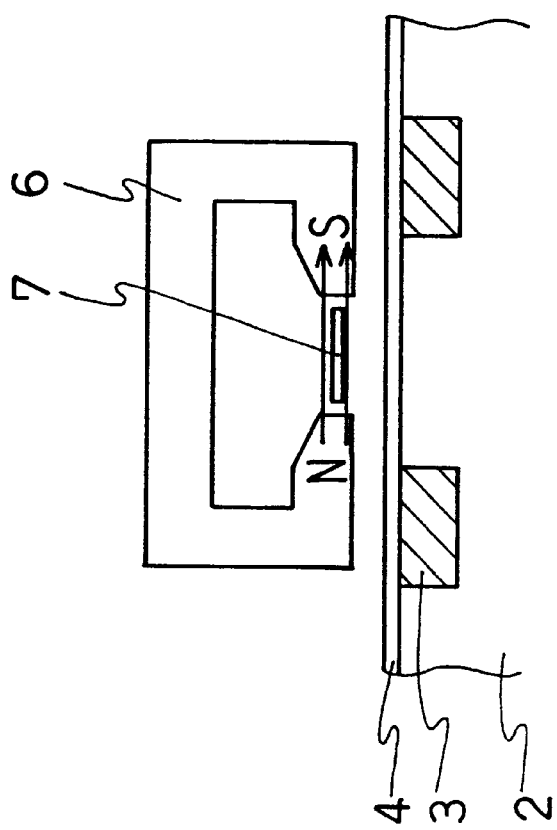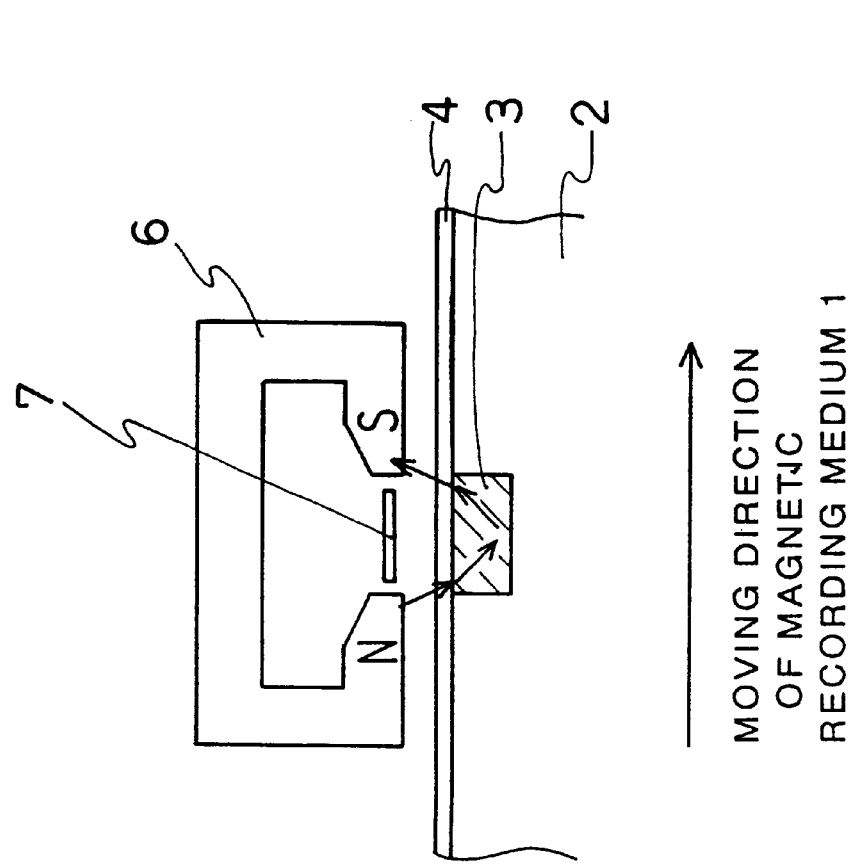
FIG. 2(a)
FIG. 2(b)

MOVING DIRECTION
OF A SUBSTRATE

MAGNETIC RECORDING MEDIUM

This application is a divisional, of application Ser. No. 08/506,871, filed Jul. 25, 1995, now U.S. Pat. No. 5,703,733.

BACKGROUND OF THE INVENTION

The present invention relates to a magnetic recording/reproducing method using a soft magnetic material in which magnetization direction is not used as a recording means. More particularly, the present invention relates to a magnetic recording/reproducing method, reproducing apparatus used therefor, a magnetic recording medium and a method for producing the same capable of recording an information signal by means of a pattern of soft magnetic material, and capable of easily making a large number of copies of the same information.

In the technical field of an optical disc or a magnetic recording apparatus, as a result of highly developed information-related techniques, a technique for mass recording data is increasingly important. Further, tracking servo techniques for positioning a recording head are indispensable for the purpose of recording data with high density.

An optical disc is an example of achieving the aforementioned needs with low cost. In the case of producing the optical disc, a master disc having concave parts and convex parts called a guiding groove, guiding pit or the like for necessary data or a servo is prepared by means of a laser direct drawing technique with high precision in the mastering process, followed by transfering the master disc to a plastic disc by means of injection molding, so that mass production can be achieved. The reason why the concave parts and the convex parts are reproduced in the optical disc with good condition, or servo operation can be performed by using the concave parts and the convex parts with good condition is marked change of intensity of the light beam reflected on the concave parts and the convex parts caused by diffraction Further, as seen in a video tape recorder, floppy disc and the like, in a magentic recording apparatus, copies of mass recorded data can be made. However, in magnetic recording, magnetic patterns of information should be written one by one by using the magnetic head, said pattern being composed of fine magnetics. Therefore, it is impossible to make such a large amount of copies that are performed by the optical disc. For that reason, copies in magnetic recording tend to be expensive. In the tracking servo of magnetic head, the pattern, which should be precisely written by the magnetic head on the magnetic medium, is usually used. There arises such a problem that the patterns are moved from the predetermined position by vibration or the like when the servo patterns are written.

On the other hand, convex parts and concave parts using the magnetic head in the magnetic disc has been performed. For instance, as disclosed in "Digest of the Intermag conference, Paper #FD-10, Stockholm Sweden (April, 1993)" or "Japanese Association of Promoting Science, the 144th committee of magnetic recording, the document number 104 (Nov. 25, 1993)", an address mark or a pit for positioning is prepared by the same method as the optical disc, followed by reading the convex parts and concave parts by the magnetic head (referring to FIG. 16).

In this method, the following two means are employed for the purpose of reading a slight change of magnetic flux caused by the magnetization of the convex parts and a concave parts of the magnetic head 41 such as shown in FIG. 16.

One is optimizing the shape of a slider (not shown in FIG. 16) carrying the head portion so that spacing of about 0.1 $\mu$m even on the convex parts and the concave parts can be stably obtained.

The other is recording by using the magnetic head so that the magnetization directions of a concave part and a convex part are anti-parallel with each other as shown in FIG. 17(b). In this specification anti-parallel means that the magnetization directions are opposed to each other in the same plane. For example, the magnetization directions of the concave parts and the convex parts are made to align in the same direction by applying an initial large magnetic field as shown in FIG. 17(a). This is followed by applying a small magnetic field so that only in the convex parts magnetization directions are reversed as shown in FIG. 17(b). By virtue of the magnetic head with spacing substantially the same as the difference between a height of the convex part and a height of the concave part, a large magnetic field can be applied to the convex part and small magnetic field can be applied to the concave part. Even in the magnetic head, a large signal can be obtained by making the magenetization directions of the convex parts and the concave parts anti-parallel to each other.

By using the above-mentioned method, there arises no such a problem that the patterns are moved from the predetermined position by the vibration in case of writing a servo pattern. For that reason, the servo operation can be performed in good condition. However, even in the method of using the convex parts and the concave parts, the magnetic patterns should be recorded by using a hard magnetic material in the surface, followed by applying a magnetic field.

Further, there is disclosed the other apparatus in Japanese Unexamined Patent Publication No. 77615/1974. As shown in FIG. 18, the apparatus comprises a permanent magnet 43, a Hall element 44, a magnetic member 45 made of a material having high permeability and a thin magnetic film 46 made of a material having high permeability. Since the apparatus is used for reproducing of magnetic card, a large pattern of several hundred micro meters to 1 mm is reproduced. For that reason, in the apparatus there is provided first and second gaps in a magnetic circuit. The Hall element is located in the first gap interposed between the permanent magnet 43 and the magnetic member 45. Between the permanent magnet 43 and the magnetic member 45, there is formed the second gap for detecting the thin magnetic film. The magnetic circuit is formed with interposing the gaps. When the thin magnetic film comes near the second gap between the permanent magnet and the magnetic member where the card is located, a large amount of the magnetic flux flows in the Hall element. While on the other hand, when the thin magnetic film is not located in the place near the second gap, there is a small flow of the magnetic flux flowing into the Hall element since a magnetic reluctance is large in the magnetic circuit. The large and small magnetic fluxes flowing into the Hall element are transformed to a large and small Hall voltage as an electric signal.

According to the conventional apparatus provided with the convex parts and the concave parts on the magnetic disc, it is required to keep the magnetic head floating with spacing of about 0.1 $\mu$m. For that reason, it is required to make the recording medium and the magnetic head close for the purpose of avoiding an effect caused by fine particle such as dust, so that it is impossible to exchange the recording medium. Further, in order to make the magnetization directions of the convex parts and the convave parts anti-parallel to each other, it is required to employ the magnetic head for writing a magnetization. Therefore, there is a problem in which the many copies each having information identical with each other will be produced with increased cost. Further, there arises the problem that the magnetic patterns are erroneously cancelled by an effect of the external magnetic field since the magnetic patterns written on the magnetic medium are employed as information.

On the other hand, the conventional apparatus using a Hall element includes an insulating film formed on both sides of the Hall element and the first gap with spacing of at least 100 µm to several hundred micro meters for the purpose of connecting with a lead or lead wire. For that reason, the magnetic reluctance in the magnetic circuit becomes large. When the spacing of the second gap located in the side of the card (recording medium) is small, changing of the Hall voltage depending on the presence of the thin magnetic film is small, and a desired SN ratio is difficult to obtain. Accordingly, the spacing of the gap on the card side is required to range between several hundred micro meters to about 1 mm, so that the information with high density cannot be reproduced.

The object of the present invention is to solve the above-mentioned problem, and to provide a magnetically recording/reproducing method in which a large number of copies can be easily made in the same manner as an optical disc, and so in which information with high density can be recorded and reproduced while using magnetism.

Another object of the present invention is to provide a magnetic reproducing apparatus used for the above-mentioned magnetically recording/reproducing method in which information with high density recorded in a magnetic recording medium can be surely reproduced from the magnetic recording medium.

Yet another object of the present invention is to provide a magnetic recording medium and method for the same in which a large amount of copies can be made and information can be recorded with high density.

SUMMARY OF THE INVENTION

These and other objects are realized in the present invention, which in one aspect is a magnetically recording/reproducing method including the steps of:

recording an information signal by forming a pattern of a soft magnetic material in a magnetic recording medium;

providing a magnetoelectric converting element in a place neighboring a face of forming said pattern of said magnetic recording medium;

applying a magnetic field to said magnetoelectric converting element; and reproducing said information by detecting a variation of said magnetic field caused by presence or absence of said soft magnetic material based on said pattern of said soft magnetic material of said magnetic recording medium while relatively moving said magnetoelectric converting element and said magnetic recording medium.

In another aspect, magnetically recording/reproducing method includes a step where information signal is reproduced by providing a magnetic head comprising a magnetic circuit including a magnet and magnetic gap, and a magnetoelectric converting element provided in said magnetic gap such that said magnetic gap of said magnetic head faces to said magnetic recording medium, and by detecting a variation of a magnetic flux in said magnetic gap caused by that said pattern of said soft magnetic material approaches to said magnetic gap by said relatively moving.

Another feature of the magnetically recording/reproducing method maybe that said information signal is reproduced by applying said magnetic field in a direction vertical with respect to said magnetic recording medium, and detecting a variation of the direction of magnetic field passing through said magnetoelectric converting element caused by that said pattern of said soft magnetic material approaches to said magnetoelectric converting element by said relatively moving.

Recording of the information may be performed by forming a pattern of a soft magnetic material, causing a magnetoelectric converting element to approach said magnetic recording medium, applying magnetic field, and relatively moving said magnetic recording medium and said magnetoelectric converting element.

For that reason, the presence or absence of a soft magnetic material based on said pattern sequentially approaches to said magnetoelectric converting element or separates from said magnetoelectric converting element such as an MR element film due to the relative movement. In the applied magnetic field, when the soft magentic material is located in a place near the magnetoelectric converting element, the magnetic reluctance of said soft magenetic material is smaller than that of said magnetoelectric material when there is not any soft magnetic material. Therefore, the magnetic flux is easily concentrated, and the magnetic field is bent.

When the magnetic field is applied to an MR film, the magnetic reluctance hardly changes even if the magnetic field is applied in a direction perpendicular to said MR film. On the other hand, there is a variation of the magnetic reluctance in the case of applying the magnetic field having a component in the direction parallel to said MR film.

Therefore, the variation of the magnetic field can be seen if only a voltage or an electric current between both ends of the MR film is measured. As a result, the information such as spacing of adjacent patterns can be seen, and the information can be reproduced. Further, the recording of the information is formed by means of the pattern of soft magnetic material, so that the information cannot be influenced by external magnetic field, and high reliability can be achieved.

The magnetoelectric converting element may be provided in the magnetic gap in the magnetic circuit such that the magnetoelectric converting element is arranged in a place neighboring the pattern of the soft magnetic material in the magnetic recording medium. Accordingly, the magnetic flux completely passes through the magnetoelectric converting element provided within the magnetic gap if the pattern of the soft magnetic material is not located in a place neighboring the magnetic gap, whereas the most part of the magnetic flux passes through the soft magnetic material having a small magnetic reluctance, and the magnetic flux never passes the magnetoelectric converting element if the pattern of the soft magnetic material is located under the magnetic gap due to the relatively moving. As a result, a variation of the electric resistance of the magnetoelectric converting element can be detected, and the information of the pattern of the soft magnetic material can be reproduced.

The magnetic field applied to the magnetic recording medium in the direction perpendicular to the magnetic recording medium is bent in the side of the pattern of the soft magnetic material in such a case that the soft magnetic material is close to the pattern of the soft magnetic material. For that reason, the magnetic flux passing through the magnetoelectric converting element is directed in the direction perpendicular to the magnetic recording medium if the pattern of the soft magnetic material is located apart from the magnetoelectric converting element, whereas a part of the magnetic flux is bent in the side of the pattern of the soft magnetic material when the pattern of the soft magnetic material comes near the magnetoelectric converting element, so that magnetic reluctance of the magnetoelectric converting element is varied and the patterns of the informations of soft magnetic material can be reproduced.

A magnetic reproducing apparatus of the present invention comprises: a table for loading a magnetic recording medium in which information signals are recorded, a magnetoelectric converting element provided in a place neighboring said magnetic recording medium loaded on said table, a magnet applying a magnetic field to at least said magnetoelectric converting element, and a means for relatively moving said table and said magnetoelectric converting element.

In accordance with the magnetic reproducing apparatus of the present invention, the magnetoelectric converting element is provided in a manner as to be close to the magnetic recording medium, magnetic field can be applied and the magnetic recording medium and the magnetoelectric converting element can be relatively moved. Accordingly, the informations recorded in the magnetic recording medium by the patterns of soft magnetic material can be precisely reproduced due to the above-mentioned function.

A magnetic recording medium of the present invention comprises: a substrate, and at least one pattern formed on the surface of the substrate by the soft magentic material, said pattern corresponding to the information signal.

In accordance with the magnetic recording medium of the present invention, information are recorded by the patterns of the soft magnetic material. For that reason, the informations can be reproduced easily and surely by the magnetoelectric converting element and applied magnetic field. Further, informations are recorded by the soft magnetic material. Therefore, there happens no erroneously delete or variation caused by external magnetic field, the informations can be easily copied since the informations are not recorded by magnetization.

A method for producing a magnetic recording medium of the instant invention comprises: providing a soft magnetic material film on a surface of a substrate, said film being any one of a soft magnetic thin film, fine particles or leaf, and forming a pattern of a soft magnetic material corresponding to an information signal by etching said soft magnetic material film.

A method for producing a magnetic recording medium of another aspect of the instant invention comprises: forming a plastic substrate on which concave and convex are formed corresponding to an information signal by injection molding, and providing a soft magnetic material film on whole surface of said substrate.

A method for producing a magnetic recording medium of still another aspect of the instant invention comprises a step of forming concave and convex corresponding to an information signal by stamping on a surface of a substrate, at least said surface of said substrate being made of soft magnetic material.

In accordance with the method for producing the magnetic recording medium of the instant invention, the patterns of the soft magnetic material are formed, so that even a extremely fine pattern can be precisely formed. In accordance with the method for producing the magnetic recording medium of another aspect of the instant invention, the plastic substrate on the surface of which the concave and the convex are formed is easily formed by injection moulding, the soft magnetic material is formed on the surface by sputtering or vacuum evaporation. For that reason, the patterns of the concave and the convex can be easily formed. In accordance with the method for producing the magnetic recording medium of still another aspect of the instant invention, the concave and the convex are formed by stamping, so that the concave and the convex can be easily and precisely formed.

BRIEF DESCRIPTION OF THE DRAWINGS

FIG. 2(a) and FIG. 2(b) are an explanatory view explaining an operational principle of FIG. 1;

DETAILED DESCRIPTION

Figure 1:
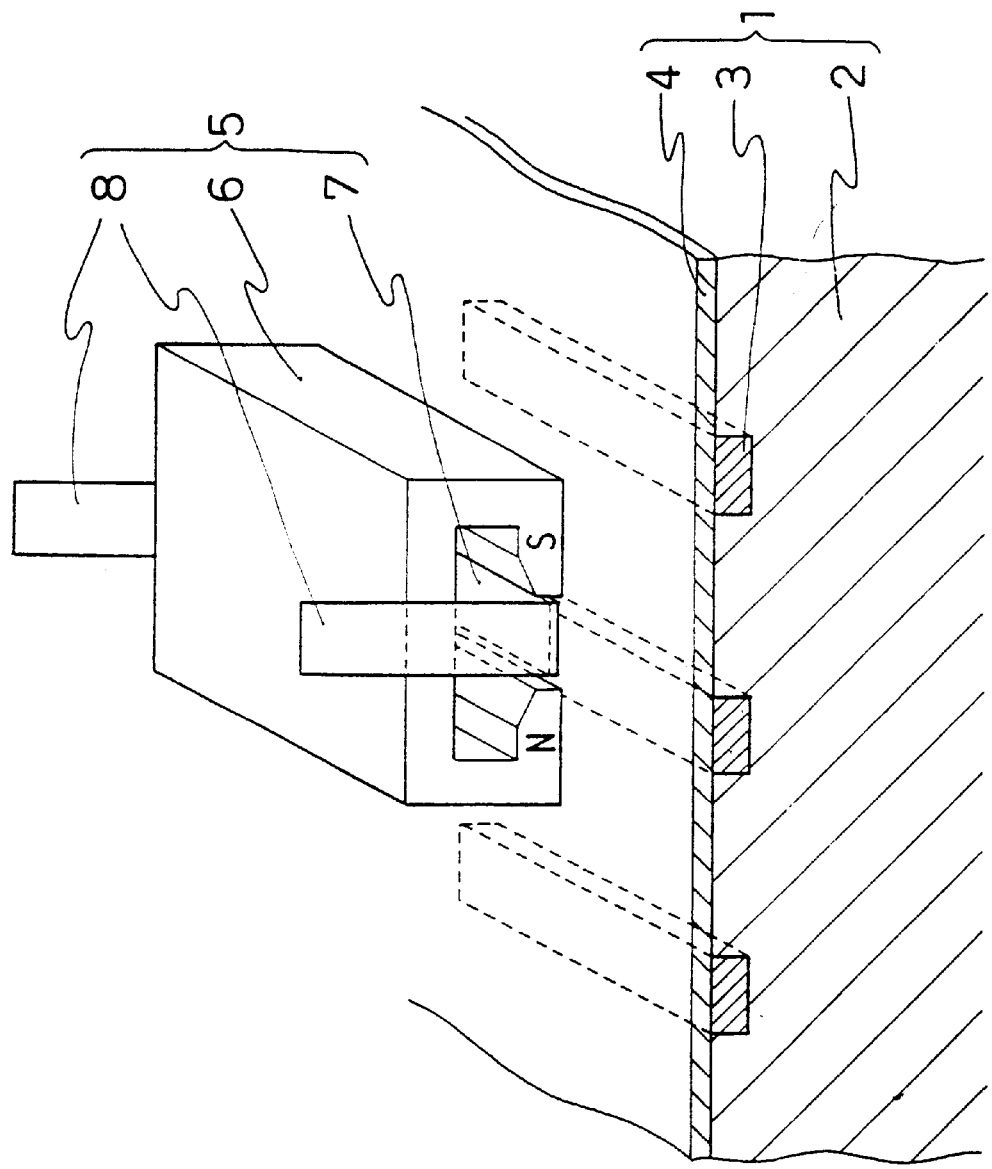
FIG. 1 is a perspective view illustrating a magnetically recording/reproducing method of example 1 of the present invention.

A magnetically recording/reproducing method, magnetic reproducing apparatus, magnetic recording medium and method for producing the same are described with reference to Figures.

The magnetically recording/reproducing method of the present invention is characterized in that an information signal is recorded by forming a pattern of soft magnetic material in a magnetic recording medium a, a magnetoelectric converting element is provided in a place neighboring the recording medium on which the pattern is formed and a magnetic field is applied, and the information signal recorded in the magnetic recording medium is reproduced by detecting a variation of the magnetic field depending on presence or absence of the pattern (i.e. existing or non-existing of the pattern) of the soft magnetic material of the recording medium while moving the magnetic recording medium relative to the magnetoelectric converting element.

Further, magnetic reproducing apparatus of the present invention includes a table for loading the magnetic recording medium, a magnetoelectric converting element provided in a place neighboring the magnetic recording medium loaded on the table, a magnet applying a magnetic field to at least a part of the magnetoelectric converting element, and a means for moving the magnetoelectric converting element relative to the table for loading.

Furthermore, in accordance with the magnetic recording medium of the present invention, the magnetic recording medium is provided with a pattern corresponding to the information signal formed by a soft magnetic material on the surface of the substrate. A signal for tracking servo can be written at the same time.

In accordance with the present invention, the magnetoelectric converting element is provided in a place neighboring the magnetic recording medium, a variation of the magnetic field passing through the magnetoelectric converting element due to the moving of the pattern of the soft magnetic material formed on the magnetic recording medium is detected, so that the information recorded in the magnetic recording medium is read in the form of the electric signals transformed by the magnetoelectric converting element. That is, the variation of the magnetic field due to the pattern of the soft magnetic material is directly detected by the magnetoelectric converting element neighboring the pattern. Accordingly, even a fine pattern can be precisely read with high sensitivity. In this respect, the method in accordance with the present invention is quite different from the conventional method in which the magnetic pattern located in one gap in the magnetic circuit is used as a part of the magnetic circuit, and a Hall element is provided in another gap in the magnetic circuit, thereby the variation of the magnetic flux in the magnetic circuit is read.

For that reason, in accordance with the conventional method, absence or presence of the magnetic material should be repeated by the length larger than the length of the another gap of the magnetic circuit in which the Hall element is provided, and the magnetic material of the pattern should be made in such a manner that a size of the magnetic material is more than several hundred micro meters.

Further, in accordance with the present invention, the magnetoelectric converting element is provided in a place neighboring the magnetic recording medium. Accordingly, it is not necessary to provide the magnetoelectric converting element in a place located apart from the magnetic recording medium via the magnetic circuit, and the patterns can be detected with high sensitivity without any influence of attenuation due to the magnetic circuit.

Further, in accordance with the present invention, the pattern of the soft magnetic material is not used as a part of the magnetic circuit. Accordingly, recorded information can be read out when the magnetic field is applied even if the magnetic head in which any closed magnetic circuit is formed is not used.

As the method for applying the magnetic field, one method is to provide a magnetoelectric converting element in the gap formed in a part of the magnetic circuit as shown in FIG. 1, and form the magnetic flux flowing in the direction parallel to the magnetic recording medium, and detect a variation of the magnetic flux due to the pattern of the soft magnetic material, and the other is to apply the magnetic field in the direction perpendicular to the magnetic recording medium, and detect the variation due to bending of the magnetic flux in the place neighboring the pattern by means of the pattern of the soft magnetic material.

A permanent magnet or an electric magnet can be used as the magnet. The permanent magnet is superior because of an electric power not to be applied, whereas the electric magnet is superior because of the magnetic field strength capable of adjusting. As the magnetoelectric converting element which converts a variation of the magnetic field into an electric signal, magnetoresistive converting element (hereinafter referred to as an MR element), a giant magnetoresistive converting element (hereinafter referred to as a GMR element), a Hall element or the like can be employed. In view of a sensitivity of the magnetic field (a rate of change of electric resistance relative to unit of change of magnetic field), the MR element or the GMR element is preferably employed.

The means for relatively moving the magnetoelectric converting element includes a motor for driving a magnetic recording medium and a mechanism for fixing a center of the medium to a driving shaft of the motor when the magnetic recording medium is a circular disc. Further, the means includes a linear motor for moving a medium or a head when the magnetic recording medium is a rectangular card.

Figure 4:
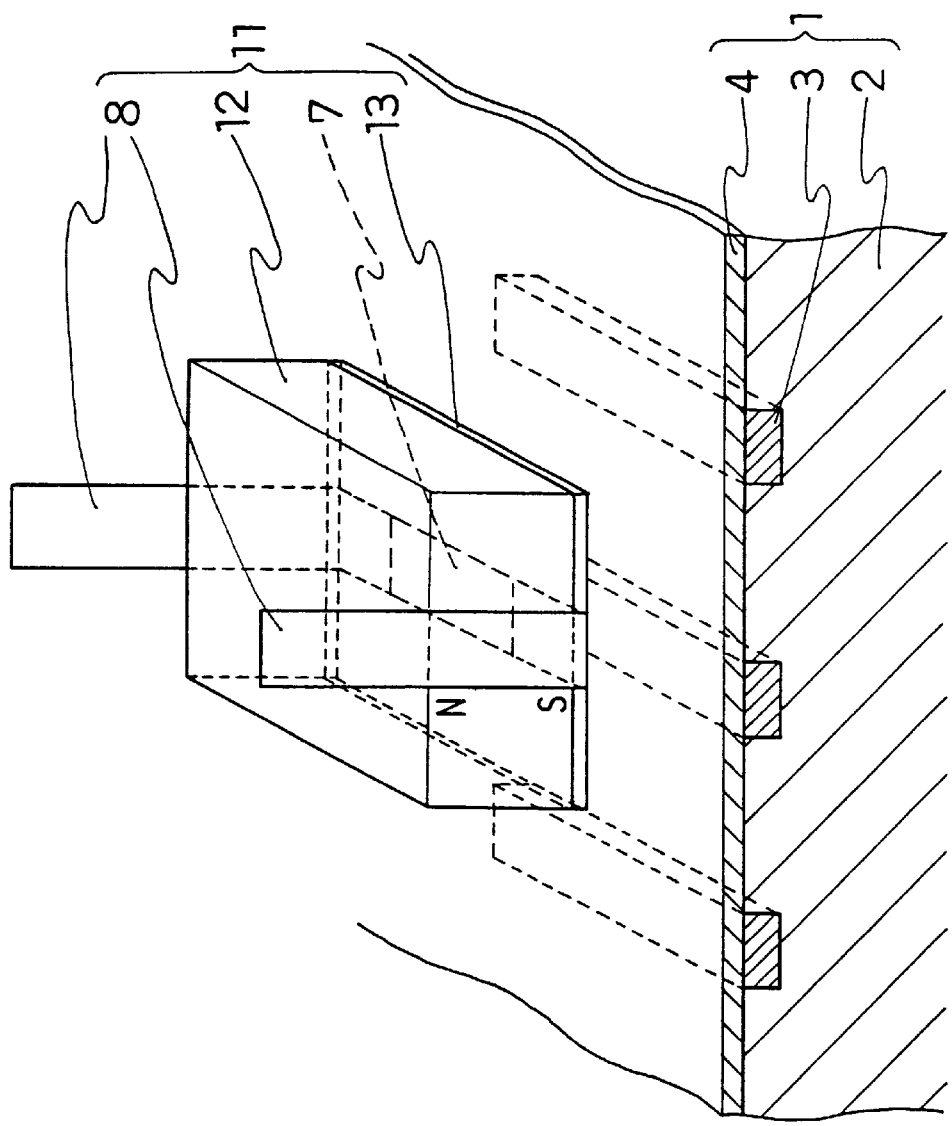
FIG. 4 is a perspective view illustrating a magnetically recording/reproducing method of example 2 of the present invention.
Figure 11:
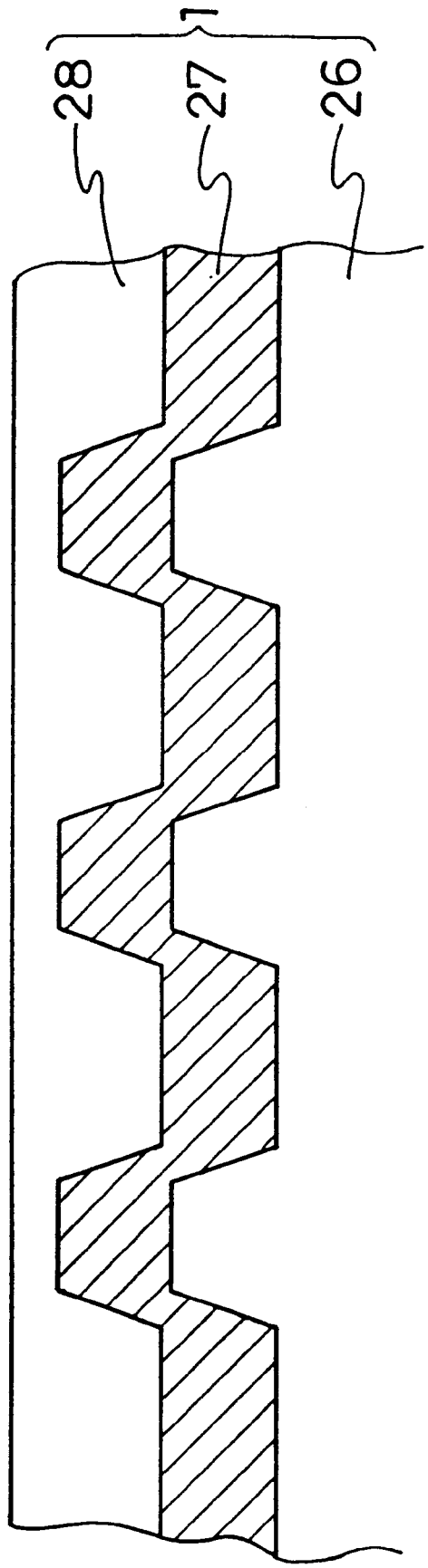
FIG. 11 is a fragmentary sectional view showing one example of magnetic recording medium.
Figure 13:
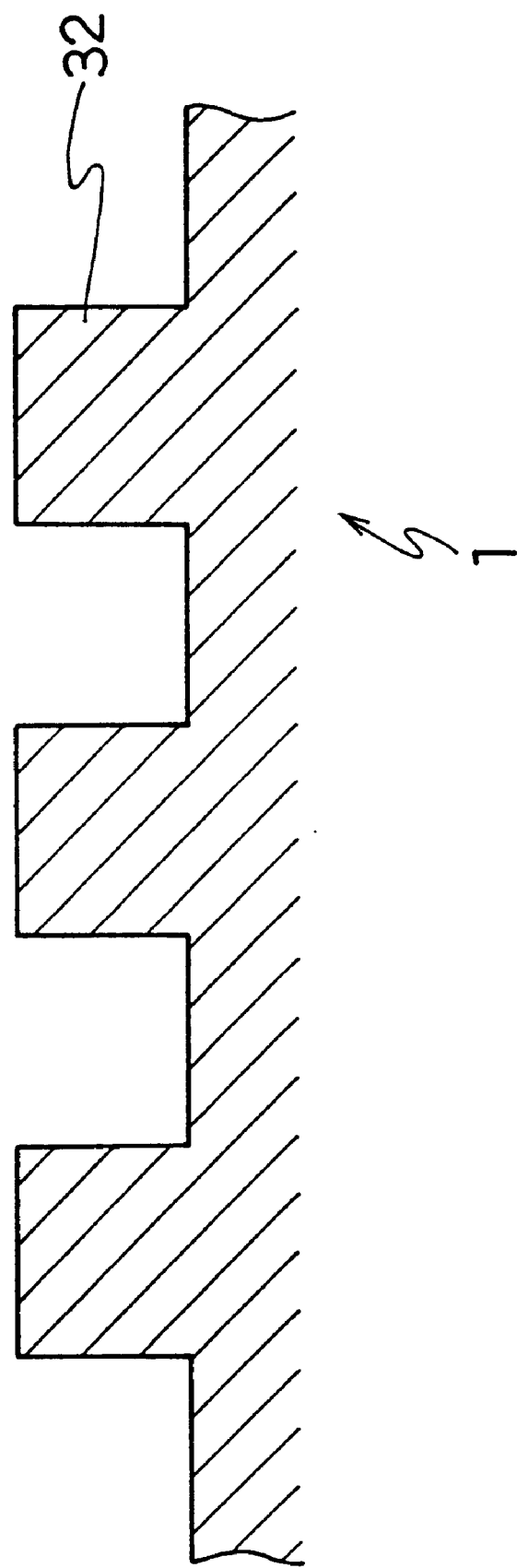
FIG. 13 is a fragmentary sectional view showing still another example of magnetic recording medium.

The magnetic recording medium 1 can be formed into a pattern 3 of the soft magnetic material partially formed with corresponding to the information signal on the substrate made of non magnetic material such as plastic, aluminum, glass as shown in FIGS. 1 or 4. Further, whole surface of the magnetic recording medium may be covered with the soft magnetic material as shown in FIGS. 11 or 13, and the surface is formed into concave parts and convex parts. Thereby, the concave parts and the convex parts can be used as a pattern of the soft magnetic material. In this case, if a vertical difference between the concave part and the convex part is about 1 $\mu$m, the concave part is located apart from the magnetoelectric converting element, so that the concave part functions as if there were not any soft magnetic material.

Figure 12:
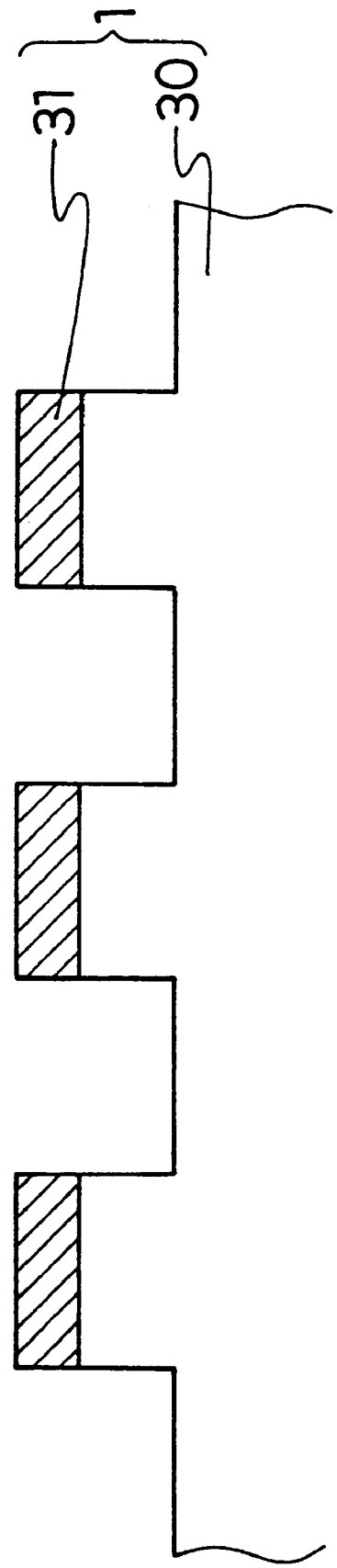
FIG. 12 is a fragmentary sectional view showing another example of magnetic recording medium.

Furthermore, when the soft magnetic material is partially formed on the substrate as mentioned before, in FIGS. 1 or 4 the soft magnetic material is buried in the concave part formed on the substrate made of non magnetic material. However, the soft magnetic material may be formed on the surface of the substrate so as to form a convex In this case, as shown in FIG. 12, the pattern can be projected by etching to expose the non magnetic substrate. The projected portions (i.e. the convex parts) can be flat by forming a protecting film on the surface.

The soft magnetic material for forming a pattern of the information signal generally means a material having a large relative permeability. The material of which relative permeability is not smaller than 50 is preferably employed. As the soft magnetic material, Fe—Ni, Fe—Ni—Co, Ni—Co, Fe—Si—Al, Co—Fe—Si—B, Co—Zr—Nb, Fe—Ta—N, Fe—Zr—N or the like can be employed.

In accordance with the method of claim 4, the information signals of a plurality of tracks are reproduced simultaneously by providing a plurality of magnetoelectric converting elements, thereby achieving a reproducing speed of several times as fast as the reproducing speed of the conventional method. Continuous output can be kept by storing the reproduced informations of the following tracks in a memory or the like, then reproducing all of the preceeding informations, followed by outputting the informations.

Tracking servo may be performed while reproducing the recorded informations, thereby constantly modifying of the track and correctly detecting on the track can be performed. As a result, correct informations with small noise can be reproduced.

The information may be detected by dividing a magnetoelectric converting element divided into two parts. For that reason, each of said two parts can detect a half of the track.

When the magnetoelectric converting element is correctly positioned on the track, one output from one of said two parts is identical with the other output from the other of said two parts. When the magnetoelectric converting element is not positioned on the track, there is generated a difference between two detecting signals. Therefore, tracking servo can be performed by correcting the track in such a manner that the one detecting signal is equal to the other detecting signal of the magnetoelectric converting element divided into two parts. Further, the recorded information can be reproduced by using a signal of summing both two detecting signals.

The magnetic head in which the magnetoelectric converting element may be provided within the gap is provided such that the magnetic gap is close to the magnetic recording medium. Therefore, the information of the magnetic recording medium can be precisely reproduced by the above-mentioned effect.

The magnetic head may include a magnet and a magnetoelectric converting element provided in either of magnetic poles of said magnet. Therefore, variation of the magnetic field, which is caused by the patterns of the soft magnetic material of the magnetic recording medium, can be detected and reproduced.

The magnet can be provided in a manner as to be positioned apart from the magnetic head. For that reason, the magnetic head is composed of only a magnetoelectric converting element. However, the variation of magnetic field caused by the magnet positioned apart from the magnetic head can be detected, and the information of the magnetic recording medium can be reproduced.

A plurality of the magnetoelectric converting elements may be provided. For that reason, the informations of a plurality of the tracks can be reproduced simultaneously, or tracking servo can be performed while reproducing said informations.

Any one of an MR element, a GMR element or a Hall element may be employed as a magnetoelectric converting element, so that even a slight change of the magnetic field can be surely detected.

The magnetoelectric converting element may be divided into two parts so that recorded information of track width are divided into two parts, each of which can be detected. For that reason, tracking servo can be performed more easily by comparing one of said two with the other.

A lead wire can be formed in a manner as to extend in the same direction as the direction of film of either the MR film or the GMR film As a result, the magnetic head can be easily produced.

The patterns for tracking servo may be formed so that tracking servo can be performed while reproducing of the informations.

The patterns may be formed by existing or non-existing of the soft magnetic material, so that variation of the magnetic field caused by the patterns can be surely obtained.

The patterns may be formed by concave and convex parts of the surface of the soft magnetic material. The concave parts are positioned apart from the magentoelectric element, so that the concave parts are not influenced by the magnetic flux, whereas the convex parts are positioned in a place close to the magnetoelectric converting element, so that the magnetic flux passing through the magnetic converting element is bent to cause a variation. The patterns formed by the concave and the convex can be copied by stamping or press working with large quantity, and are suitable for mass-production.

The patterns may be formed on the surface of the substrate by providing the soft magnetic material film For that reason, plastic or the like can be used as a substrate because it easily forms the concave and the convex surfaces. Further, in the case of using a bulk material of the soft magnetic material the patterns can be formed by stamping or moulding.

The surface may be made to be flat by forming a protecting film, so that there exists no such a concave and a convex. Therefore, fine particle such as dust can not be easily stuck on the surface.

EXAMPLE 1

In FIG. 1, numeral 1 denotes a magnetic recording medium The magnetic recording medium 1 comprises a plastic substrate 2, a pattern 3 made of soft magnetic material and a protecting film 4. The magnetic recording medium without the protecting film 4 can be employed. Numeral 5 denotes a magnetic head comprising a yoke type permanent magnet 6, an MR film 7 and a lead 8 for detecting a variation of electric resistance of the MR film 7.

In the present embodiment, the magnetic circuit is formed in which magnetic gap is formed in a place for providing the MR film 7. The magnetic field is applied in the magnetic gap in the direction parallel to the magnetic recording medium 1 and the MR film 7, and the magnetic flux is applied through the MR film.

The magnetic reproducing apparatus comprises a magnetic head including a yoke type magnet and a magneto-electric converting element, a table (not shown) for loading the magnetic recording medium which is provided in such a manner that the magnetoelectric converting element is close to the magnetic recording medium and a means (not shown in FIGS.) for relatively moving the table and the magentoelectric converting element.

By virtue of forming a soft magnetic material film on both side faces of the magnetic head 5 to form a magnetic shield, the influence of the other pattern adjacent to the pattern can be prevented, or the influence of an external magnetic field can be prevented, so that a resolution of the magnetic head can be increased, or an external noise can be reduced.

In turn, the operation will be explained. In FIG. 1, the magnetic recording medium is moved by the means for relatively moving (not shown in FIGS.) under the static magnetic head 5. Please note that the case where the magnetic head moves on the static magnetic recording medium 1 is identical in principle. Further, both the magnetic recording medium 1 and the magnetic head 5 can move. The important thing is that the magnetic head should be moved relative to the magnetic recording medium 1. In this case the patterns of the soft magnetic material formed on the surface of the magnetic recording medium 1 pass under the magnetic head 5 one after another.

The magnetic flux density applied to the MR film 7 from the permanent magnet 6 is varied by the relation of the relative location of the magnetic head 5 and the pattern 3 of the soft magnetic material as shown in FIG. 2. Firstly, when there is a pattern 3 just under the magnetic head 5 as shown in FIG. 2(a), almost all of the magnetic flux from the permanent magnet 6 flows in the pattern 3 of the soft magnetic material. It is the reason therefor that the pattern 3 of the soft magnetic material formed on the surface of the magnetic recording medium 1 is made of a material through which the magnetic flux is easily passed. On the other hand, when the pattern of the soft magnetic material is located in the place located apart from the magnetic head 5 as shown in FIG. 2(b), the whole part of the magnetic flux from the permanent magnet 6 flows in the MR film 7. As described above, if the relative relation of location between the magnetic head 5 and the pattern 3 of the soft magnetic material varies, magnetic flux density (i.e., the magnetic field) passing through the MR film 7 is remarkably varied. The electric resistance of the MR film 7 varies depending on changing of the magnetic flux density. For that reason, the changing of the electric resistance can be detected by a variation of a voltage or an electric current applied to both ends of the lead 8. That is, it can be detected as an electric signal whether there is the soft magnetic material based on the pattern 3 of the soft magnetic material formed on the surface of the magnetic recording medium 1.

Figure 3:
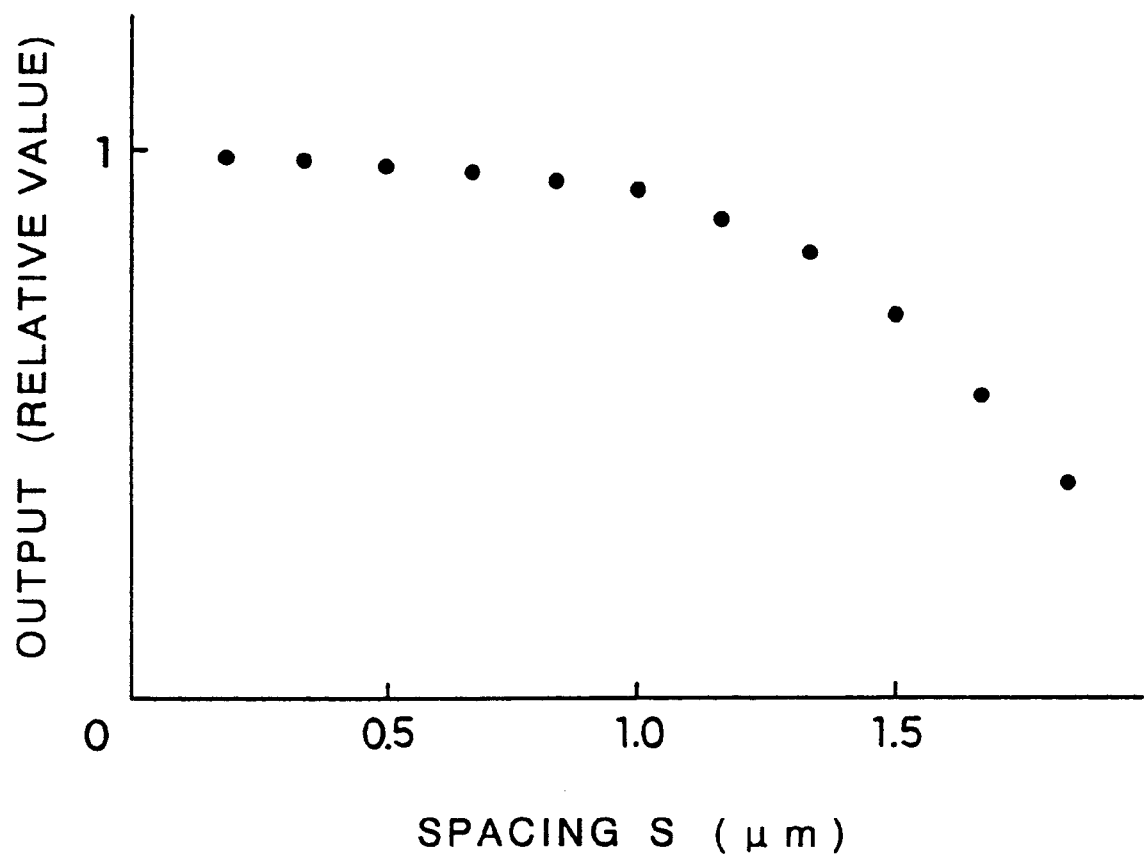
FIG. 3 is a diagram illustrating a relation between spacing S between magnetoelectric converting element and magnetic recording medium and output of magnetoelectric converting element of example 1.

In FIG. 3, there is shown the relation between a relative value of an amplitude of signal (output) obtained by the apparatus and a spacing S from the magnetic head 5 to the pattern 3 of the soft magnetic material. In this case, the pattern 3 of the soft magnetic material has a complete periodic pattern of which period is 2 $\mu$m. A relative velocity between the magnetic head 5 and the magnetic recording medium 1 is 1 m/second. Further, the signal is obtained as a curve approximating to a sine wave of which frequency is 500 kHz. As seen from FIG. 3, the spacing was as large as about half of the period of pattern 3 of the soft magnetic material. The spacing was about 1 $\mu$m.

In accordance with the present example, the medium which is recorded with high density can be reproduced with large spacing in good condition.

In example 1, the permanent magnet 6 was employed as a magnet. The same property can be obtained by employing an electric magnet instead of the permanent magnet 6. Further, the MR film 7 was employed as a detector for detecting a variation of the magnetic field (magnetic flux density). However, the variation of the magnetic field caused by the pattern 3 of the soft magnetic material can be detected by providing a GMR film instead of the MR film 7 or providing a Hall element or the like.

The magnetic recording medium 1 can be copied with lower cost by using a master disc called as a stamper. A method of producing the stamper will be explained briefly.

A photoresist of about 500 nm is applied to a substrate having high smoothness of surface by means of spin coat. The substrate is exposed by using a concentrated laser beam after pre-bake. The beam can be concentrated to have a concentration of about submicrons. Further, by virtue of having a galvanomirror or a mechanism for transferring the substrate with high precision, even in extremely fine pattern exposure can be attained. After exposure, the pattern having a desired depth can be formed on the glass substrate by developing for a suitable time. For example, weak laser beam is irradiated to a portion of the developing glass disc. By virtue of advancing of the development, patterns come out. As the patterns come out, the intensity of diffracted light becomes increasingly high. A direction of irradiating a primary diffracted light can be calculated by a pitch of the pattern. Accordingly, a photo sensor is arranged to be directed in said direction. The intensity of the primary diffracted light corresponds to the depth of the pattern with one to one. For that reason, by virtue of monitoring the intensity of the primary diffracted light, the development can be stopped when the arbitrary depth is obtained. In turn, an electric conductive material such as Ni, Cu is vacuum-evaporated on the pattern so as to have a thickness of about 10 nm Followed by plating on the conductive material such as Ni, Cu using an electric field plating so as to have a thickness of about 500 82 m. By removing the plated portion from the glass substrate, the stamper can be obtained in the removed plated portion. By virtue of carefully selecting a plating condition, the fine pattern prepared on the glass substrate can be precisely transcribed on the stamper. If need be, the stamper is subjected to an outer diameter formation or an inner diameter formation.

In the case of copying the magnetic recording medium 1 using the stamper, there are some methods as follows:

The stamping is performed with high pressure directly applying to a plastic substrate on which the soft magnetic leaf or foil made of a material such as Fe—Ni, Fe—Ni—Co, Ni—Co is applied, or the soft magentic thin film is covered by vacuum evaporation or sputtering. A pit is made by directly stamping the soft magnetic plate without employing any plastic substrate, thereby recording medium writing informations by the pattern of the concave part and the convex part is found to perform a good characteristic.

As described hereinafter in the following example, the plastic substrate in which concave parts and convex parts are formed is prepared from the stamper as well as an optical disc by means of injection moulding, and on the substrate there can be formed a soft magnetic film by coating, vacuum evaporation or sputtering to have a thickness of about 0.03 $\mu$m to about 3.0 $\mu$m. There is also a method in which fine particles of soft magnetic material are applied.

The magnetic recording medium can be reproduced with low cost and mass production by producing in such a method.

Further, in accordance with the other method, the leaf or foil made of the soft magnetic material or soft magnetic thin film provided on the substrate made of non magnetic material such as plastic is subjected to patterning to form a pattern of the soft magnetic material, then magnetic recording medium is obtained.

EXAMPLE 2

As shown in FIG. 4, the example 2 is characterized in that the magnetic head 11 having a rectangular parallelepiped shape or an elliptic cylindrical shape comprises a permanent magnet 12 magnetized in the vertical direction and an MR film 7 with interposing an insulating film 13 between the permanent magnet 12 and the MR film 7 on the side of one of the magnetic poles. The MR film 7 is formed on the surface of the magnetic head 1 of the permanent magnet 12.

In accordance with elements constituting the example 2, there is not any closed magnetic circuit. The magnetic field is applied from one end of the permanent magnet to the magnetic recording medium 1. In said one end of the permanent magnet, there is provided the MR film 7, and the magnetic flux penetrates the MR film vertically.

The magnetic reproducing apparatus of example 2 comprises a magnet, a magnetic head including a magnetoelectric converting element such as the MR film 7 formed on one end of said magnet, a table (not shown) for loading the magnetic recording medium wherein the magnetoelectric converting element is provided in a place neighboring the magnetic recording medium, and a means (not shown) for relatively moving the table and the magnetoelectric converting element.

Figure 5:
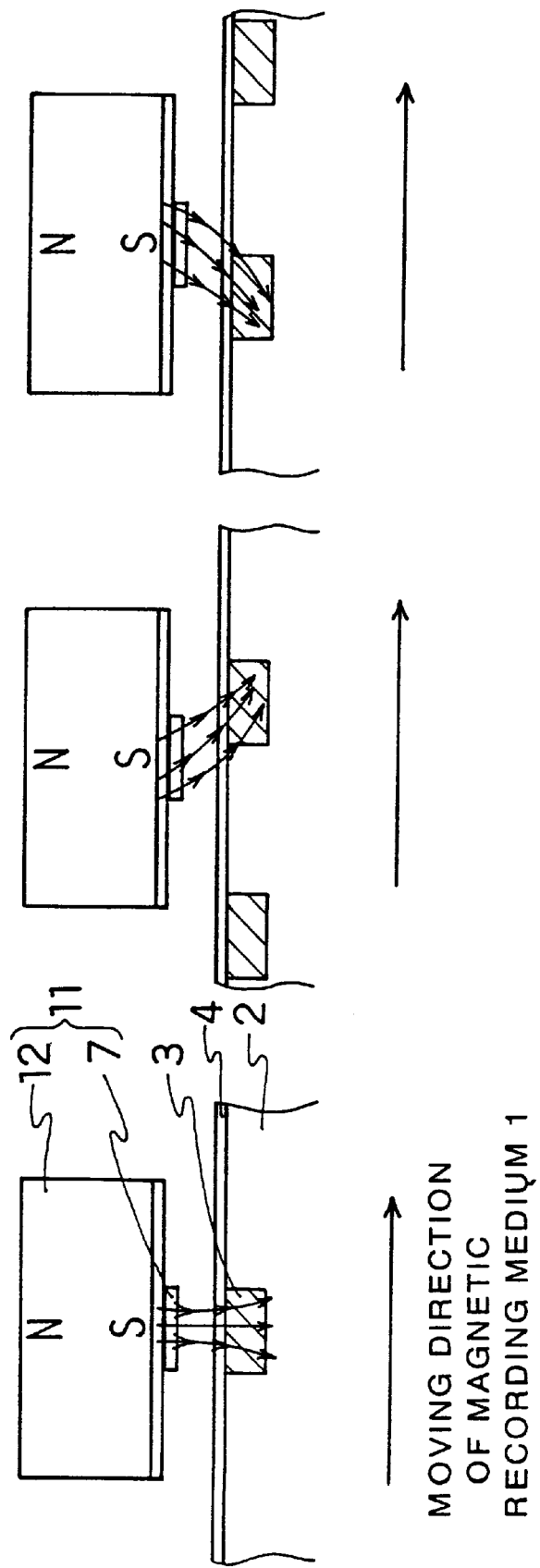
FIGS. 5(a), 5(b) and 5(c) are each explanatory views illustrating an operational principle of FIG. 4.

The operation will be explained with reference to FIG. 5. In example 2, the magnetic flux from the permanent magnet applied to the MR film 7 varies depending on the relation of the location between the magnetic head 11 and the pattern 3 of the soft magnetic material. As shown in FIG. 5(a), when the pattern 3 of the soft magnetic material is positioned just under the MR film 7, in the MR film the magnetic flux from the permanent magnet 12 has only a vertial component against a plane of the MR film 7. On the other hand, when the pattern 3 of the soft magnetic material is positioned in a place deviated from the place just under the MR film 7 to right or left direction as shown FIG. 5(b) or 5(c), the magnetic field having a component of the right or the left direction is applied to the MR film 7. In the MR film 7, there is not substantial variation of electric resistance to the magnetic field vertical to the surface of the MR film 7. However, there is a large variation of electric resistance to even a small change of the magnetic field in the MR film 7. Also in this case, it can be verified whether there is a pattern 3 or not. That is, the information recorded as the pattern 3 of the soft magnetic material in the magnetic recording medium 1 can be reproduced in good condition.

In accordance with the example 2, the change of the magnetic field applied to the MR film can be reproduced with high sensitivity, and wide spacing can be achieved.

EXAMPLE 3

Figure 6:
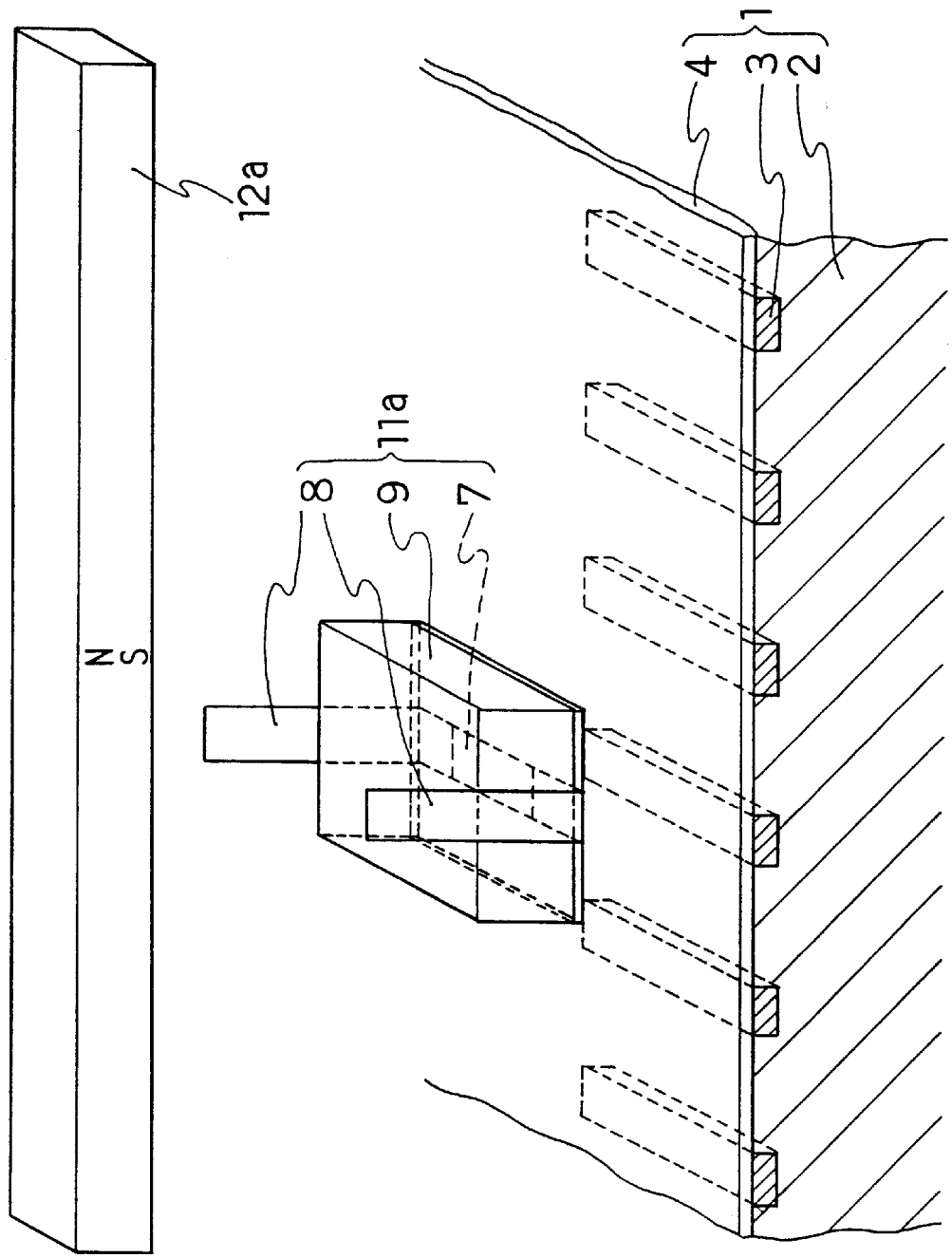
FIG. 6 is a perspective view illustrating a magnetically recording/reproducing method of example 3 of the present invention.

As shown in FIG. 6, the magnetic head 11a of example 3 comprises an MR film 7 having a lead 8 and a substrate 9. A permanent magnet (or an electric magnet) 12a is positioned just over the magnetic head 11a with being apart from a distance (several mili-meter to about 1 cm), or positioned in a place with interposing a magnetic recording medium 1. In this case, the permanent magnet is large. The magnetic field generated from the permanent magnet is uniformly applied to a broad range, for example, a range of about 1 cm. The direction of the magnetic field is substantially vertical to the magnetic recording medium 1.

Example 3 is different from example 2 in the point that the permanent magnet is provided without being integrated with the magnetic head 11a. The closed magnetic circuit is not formed in example 3, and the magnetic field is applied in the direction vertical to the magnetic recording medium 1 like example 2.

The magnetic reproducing apparatus of example 3 comprises a magnetic head including a magnetoelectric converting element such as the MR film 7, a table (not shown) for loading a magnetic recording medium, a magnet capable of applying a magnetic field in the vertical direction, and a means (not shown) for relatively moving like examples 1 and 2.

Figure 7:
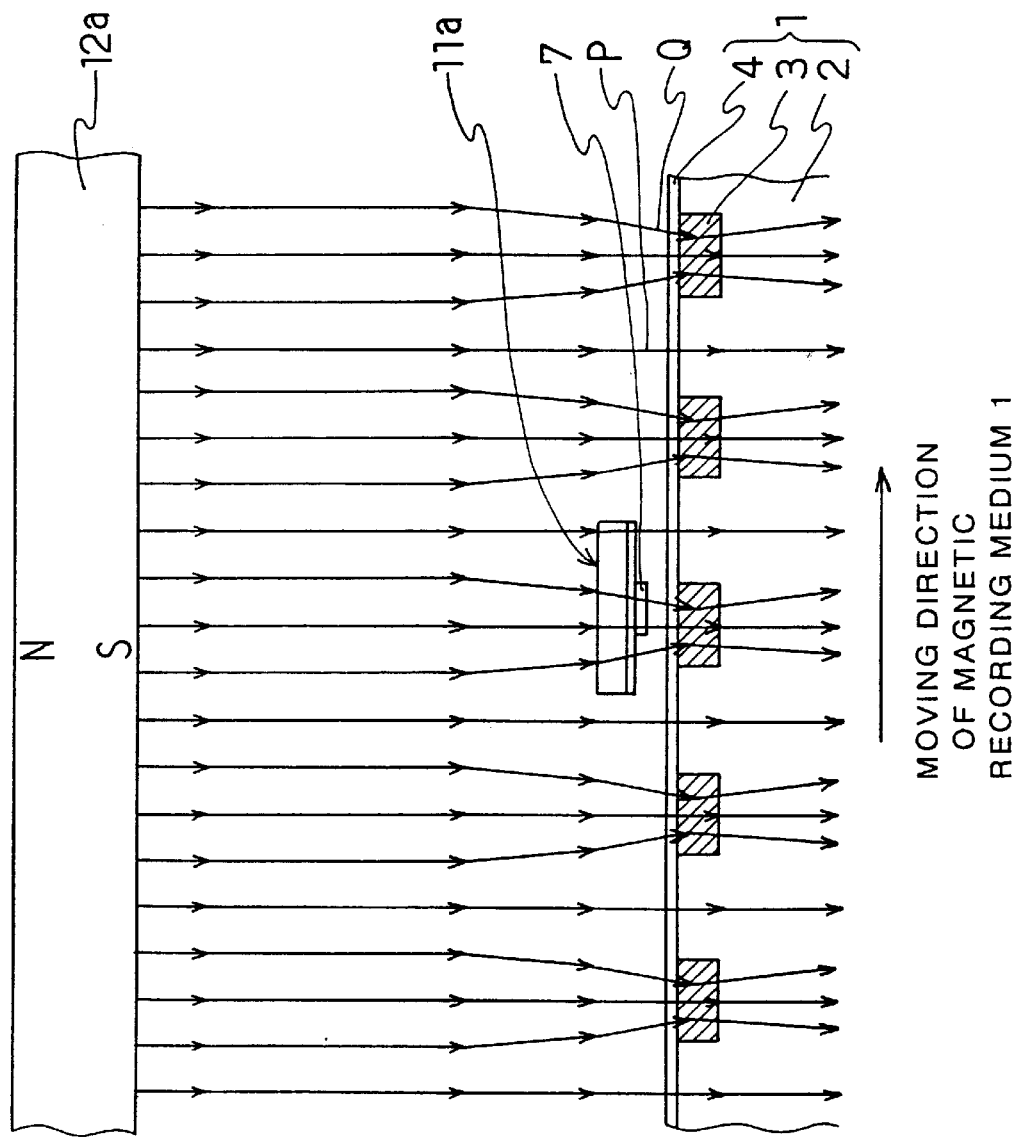
FIG. 7 is a diagram illustrating an operational principle of FIG. 6.

In turn, the operation of example 3 will be explained with reference to FIG. 7. The permanent magnet 12a is large compared with the magnetic head 11a. For that reason, as shown in FIG. 7, the homogeneous magnetic field is applied to not only the magnetic head 11a but also a surroundings thereof in the direction vertical to the magnetic recording medium (please note that the lines marked arrows show each magnetic flux). However, in the neighbourhood of the pattern 3 of the soft magnetic material in the magnetic recording medium, the magnetic flux is concentrated in the patterns, and the direction of the flux turns as shown by Q in FIG. 7. On the other hand, as shown by P in FIG. 7, in the place where there is not any pattern 3 of the soft magnetic material, there is not changed a magnetic flux. Therefore, by relatively moving the magnetic recording medium 1 to the magnetic head 11a, the patterns 3 pass under the magnetic head 11a one after another. Thereby the variation of the magnetic field can be detected As a result, the information represented by the patterns 3 of the soft magnetic material formed on the magnetic recording medium 1 can be reproduced.

In accordance with example 3, uniform magnetic field is applied to the magnetic recording medium 1 provided with patterns 3 of the soft magnetic material. For that reason, there is no such a noise that is generated in the case of moving the state of magnetization of the soft magnetic material, so that further preferable reproducing of S/N can be achieved compared with example 2.

EXAMPLE 4

Now the case where the tracking servo is subjected will be explained Any type of the magnetic head shown in examples 1 to 3 performs the same tracking servo property. Accordingly, the research was performed by using the magnetic head of example 2.

Figure 8:
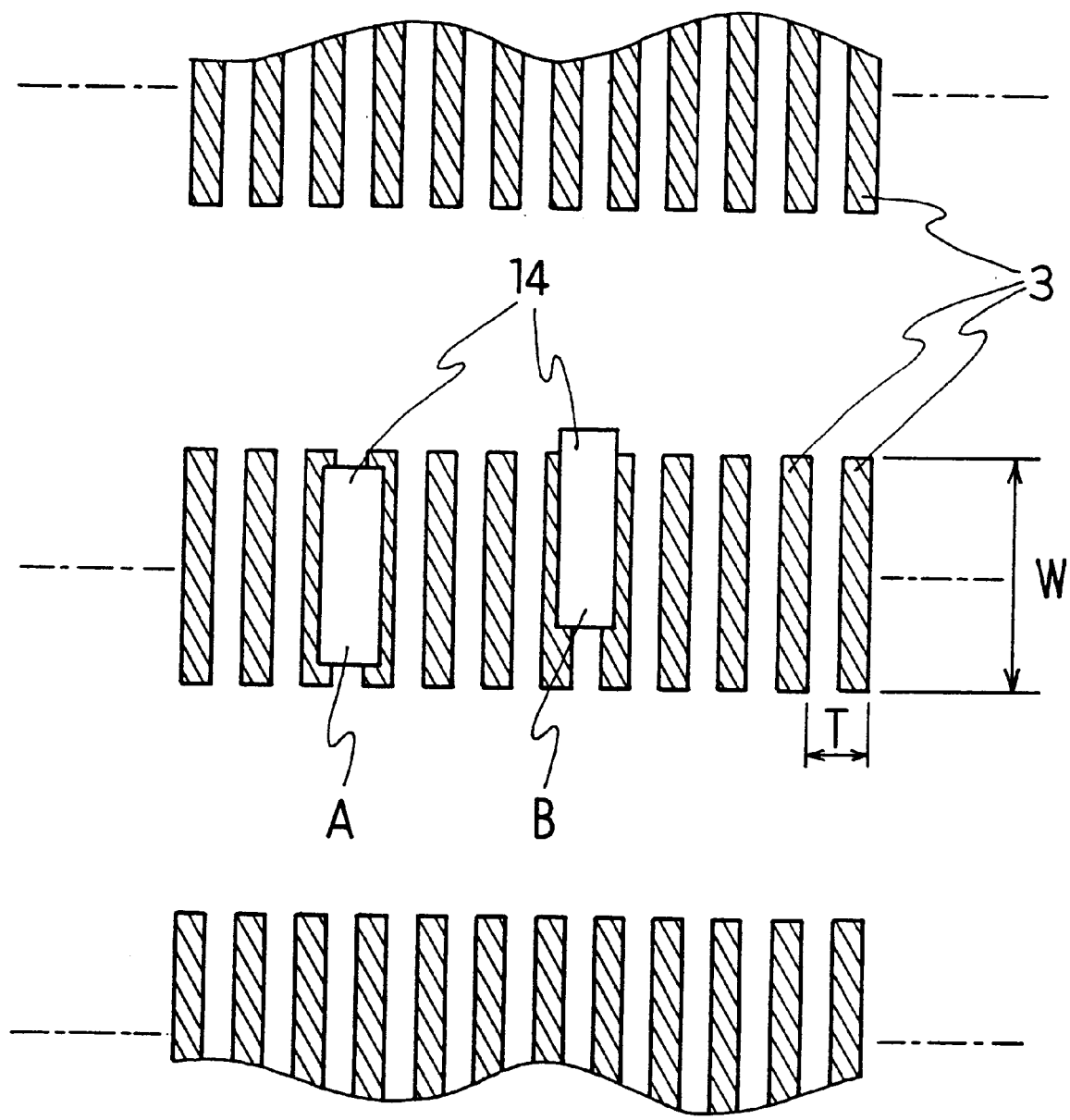
FIG. 8 is an explanatory view illustrating a relation between magnetoelectric converting element and track.
Figure 9:
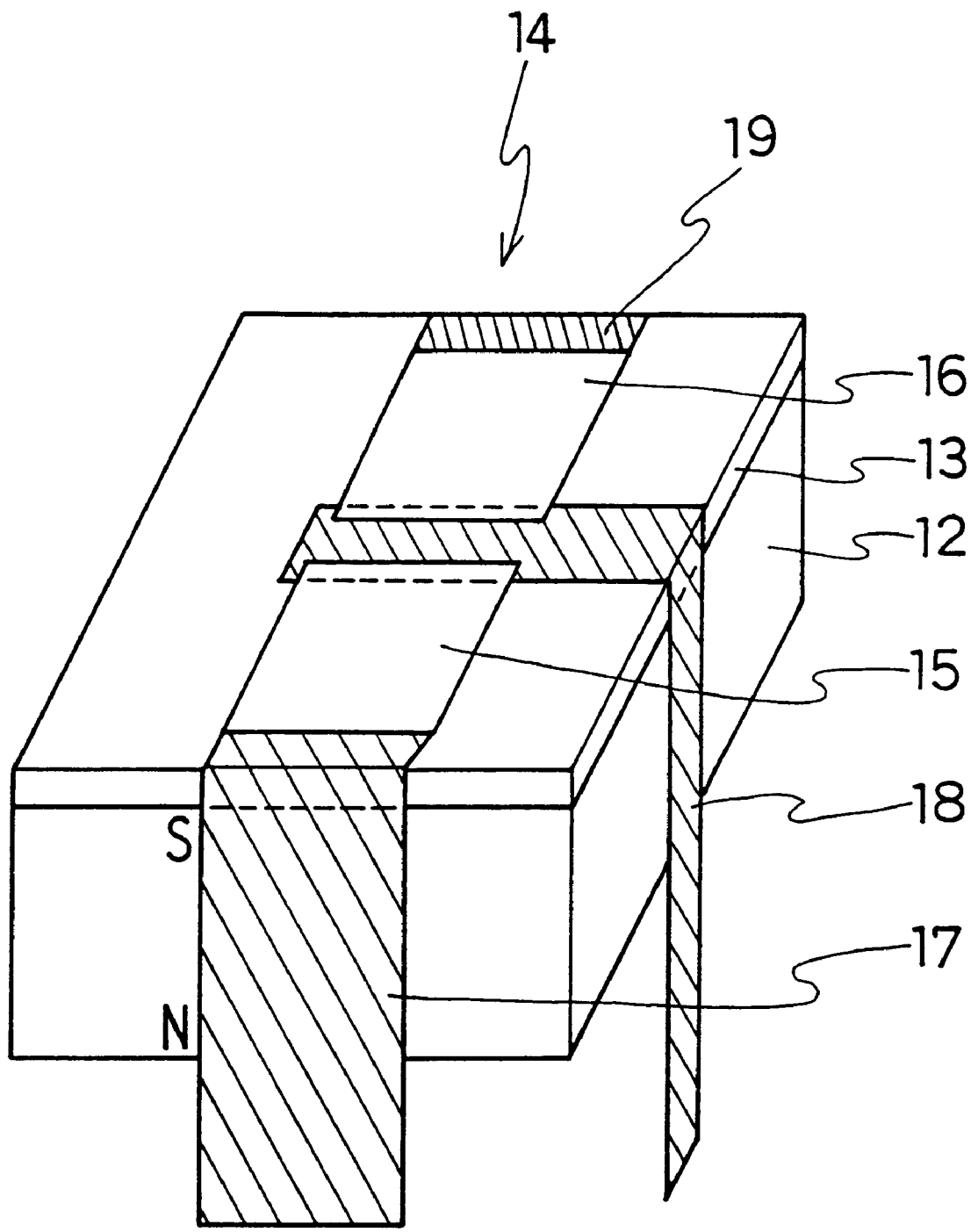
FIG. 9 is a perspective view showing one example of magnetoelectric converting element divided into two parts.
Figure 10:
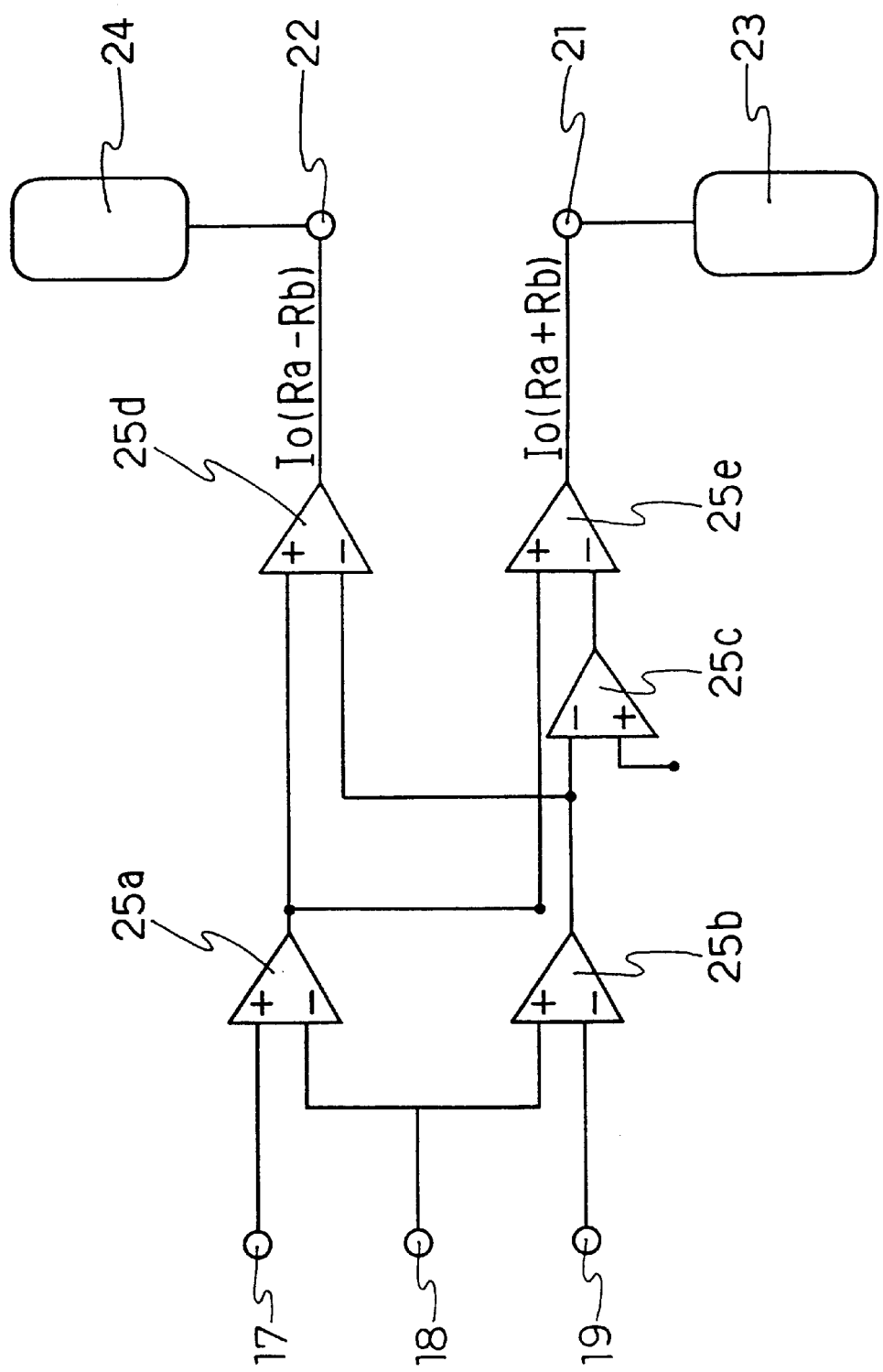
FIG. 10 is a diagram showing a circuit for processing a tracking servo signal and a reproducing signal.

In FIG. 8, there is shown a relation of the location between the pattern 3 of the soft magnetic material and the magnetic head 14 in one case A where the magnetic head is positioned just over the track, and in the other case B where the magnetic head is partially located over the track A width of the pattern (i.e., a width of the track) W is 10 μm, and each of the patterns is disposed periodically of which period T is 2 μm. As shown in FIG. 9, the magnetic head 14 comprises a permanent magnet 12, MR films 15, 16 divided evenly into two parts, and leads 17, 18, 19. A constant electric current $I_o$ is applied to the leads 17 and 19. Each of the leads 17, 18, 19 are connected to output terminal 21 and 22 via amplifiers 25a to 25e as shown in FIG. 10. If each value of electric resistance of the MR films 15 and 16 is Ra and Rb, respectively, $(Ra+Rb)I_o$ is obtained as a summed output in the terminal 21, and $(Ra-Rb)I_o$ is obtained as a subtracted output in the terminal 22. The summed output in the terminal 21 is connected to an amplifier 23 for data, and the subtracted output in the terminal 22 is connected to an amplifier 24 for servo. The amplifier 23 for data has a band width of a high frequency zone not smaller than 1 MHz, said band width being capable of sufficiently detecting a variation of the magnetic flux (i.e., the information of data pit) obtained from the period (2 μm) of the patterns of the soft magnetic material. On the other hand, the amplifier 24 for servo has a band no more than about 1 kHz. A variation of the magnetic flux obtained from the period (2 μm) of the patterns 3 of the soft magnetic material is high frequency compared with said band, so that a mean value thereof is obtained. The frequency which can be detected by the amplifier 24 for servo is a difference from ROM pit row of the patterns of the soft magnetic material. The difference is ranged between several tens hertzes and several hundreds hertzes which can be detected by the amplifier 24 for servo.

In turn, the operation will be explained. When the magnetic head 14 is located just over the rows of the patterns 3 of the soft magnetic material (see A in FIG. 8), the magnetic flux density flowing in the two MR films 15 is identical with that in the MR film 16. For that reason, the subtracted output is 0. The more the magnetic head 14 moves from the location just over the rows of the patterns 3 of the soft magnetic material (see B in FIG. 8), the more the subtracted output deviates from 0. For example, when the magnetic head 14 moves to the left, the subtracted output becomes positive, and when the right, the subtracted output becomes negative. The subtracted output is observed by the amplifier 24 for servo which can make the magnetic head 14 position just over the rows of the patterns 3 of the soft magnetic material so that the subtracted output is 0.

EXAMPLE 5

FIG. 11 is a sectional view for illustrating an example of the patterns of the soft magnetic material provided on the surface of the magnetic recording medium In FIG. 11, numeral 26 denotes a substrate made of plastic, glass, or the like in which the patterns are formed by photocurable resin, numeral 27 denotes a soft magnetic material, numeral 28 denotes a protecting film made of $SiO_2$, SiN or the like. In this case, the soft magnetic material 27 continuously formed on the surface of the recording medium 1. However, there are different distances from the magnetic head to the surface of the pattern depending on the concave part and the convex part of the substrate, said magnet being provided in a place neighboring the surface of the protecting film 28, and not shown in FIG. 11, thereby effectively performing the same function as the patterns of the soft magnetic material.

The protecting film 28 is formed by coating material having high fluidity (i.e., low viscosity) such as boro-silicated glass, photoresist or the like. Thereby flat surface of the magnetic recording medium 1 without among concave part and convex part is obtained, and a breakage or deterioration caused by contacting the magnetic head with the magnetic recording medium can be surely prevented. For that reason, an apparatus having high reliability is obtained. As mentioned above, the protecting film plays the part to improve the reliability. In view of the reproducing property, the effect of the invention is maintained without the protecting film 28.

The patterns of example 5 can be easily obtained by forming a soft magnetic material film made of Fe—Ni, Co—Ni or the like on the whole surface of the substrate 26, in which the concave parts and the convex parts corresponding to the information signals is formed by injection moulding, by means of sputtering, vacuum evaporation or the like. Further, the medium can be produced with low cost by only forming a magnetic film on the substrates which are mass-reproduced with low cost. By virtue of making the surface flat by the protecting film 28, the improvement of reliability and further stable spacing between head and medium can be achieved.

EXAMPLE 6

FIG. 12 is a sectional view illustrating another example of the patterns of the soft magnetic material formed on the surface of the magnetic recording medium 1. In FIG. 12, numeral 30 denotes a substrate made of plastic, glass or the like, numeral 31 denotes a soft magnetic material film. A protecting film is not shown. However, there is no difference between the pattern having a protecting film and the pattern without protecting film The magnetic recording medium of example 6 is obtained by forming a soft magnetic material film 31 on the substrate 30 by vacuum-evaporating or sputtering a material such as Fe—Ni, Fe—Ni—Co, or applying a thin soft magnetic material plate to the surface of the substrate 30, followed by removing the soft magnetic material film 31 in the place where the concave parts are formed by patterning and etching. In accordance with example 6, etching is performed to the substrate 30 for the purpose of surely removing the soft magnetic material film 31. However, etching is not necessarily performed to the substrate 30.

In accordance with example 6, there is not any soft magnetic material in the concave parts. For that reason, the flux is turned to the convex parts strongly so that the signals become large.

EXAMPLE 7

FIG. 13 is a sectional view illustrating still another example of the magnetic recording medium 1. In FIG. 13 the magnetic recording medium 1 is made of the soft magnetic material. By virtue of convex parts 32 formed on the surface, the patterns of the soft magnetic material are obtained. The concave part and the convex part of the surface are formed by means of press or etching. In FIG. 13 there is not shown a protecting film There is no difference between the magnetic recording medium having a protecting film and the magnetic recording medium without a protecting film.

In accordance with example 7, the magnetic recording medium 1 can be produced by only stamping with low cost.

The magnetic recording medium 1 of the present invention as mentioned above can be employed in a disc, a card, a tape or the like. On the surface of the magnetic recording medium, servo signals as well as the signals representing information can be written.

EXAMPLE 8

Figure 14:
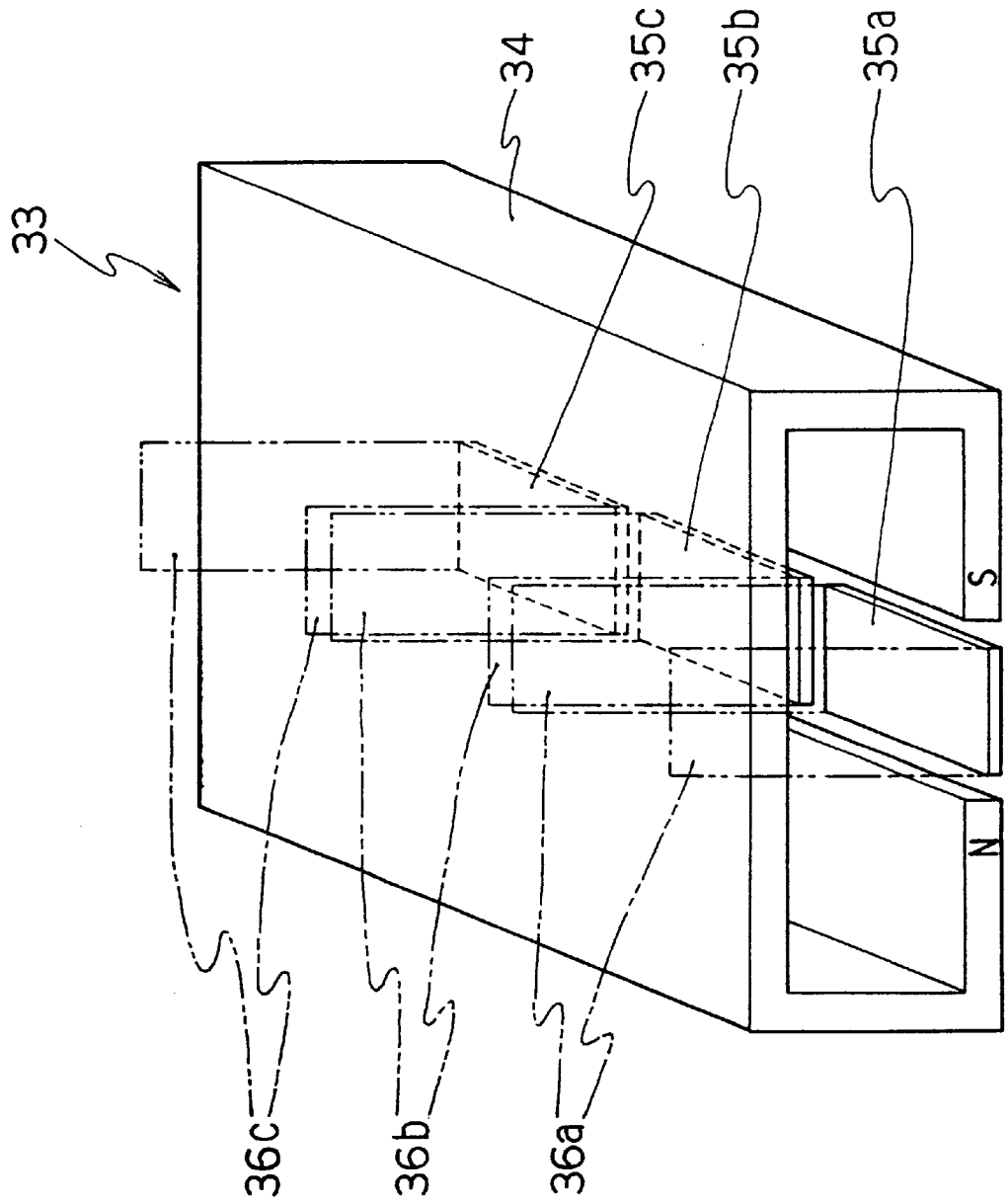
FIG. 14 is a perspective view showing another example of reproducing apparatus of the present invention.

FIG. 14 is an example of the magnetic reproducing apparatus of the present invention in which the construction of the magnetic head is changed. In example 8 multiple type magnetic head 33 including a plurality of magnetoelectric converting elements as shown in FIG. 14 which can perform highly advanced function is employed. In FIG. 14, numeral 34 denotes a permanent magnet, numerals 35a, 35b, 35c denote each magnetoelectric converting element which is made of, for example, an MR film, numerals 36a, 36b, 36c denote each lead of the magnetoelectric converting elements 35a, 35b, 35c, respectively. In accordance with example 8, the multiple type magnetic head comprises a single permanent magnet 34, a plurality of magnetoelectric converting elements 35a, 35b, 35c and a plurality of leads 36a, 36b, 36c. By virtue of thus elements constituting the magnetic head of example 8, information of a plurality of tracks can be reproduced.

As a result, the amount of information which can be reproduced in unit time is increased. For that reason, time for reproducing can be decreased. Further, the magnetoelectric converting element 35a can be employed only for tracking servo, and the other magnetoelectric converting elements 35b, 35c can be employed only for reproducing the information, so that still more stable reproducing operation can be achieved.

EXAMPLE 9

Figure 15:
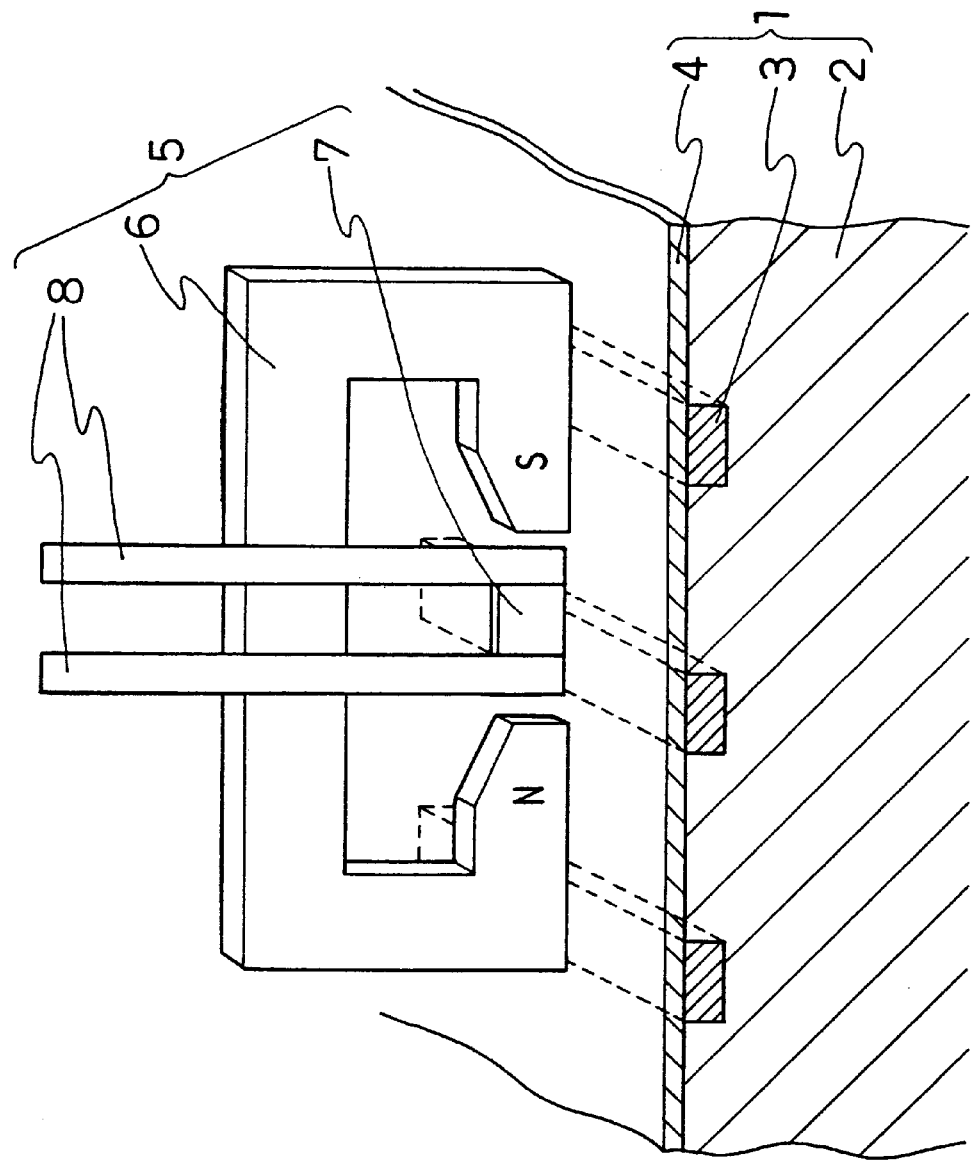
FIG. 15 is a perspective view showing still another example of reproducing apparatus of the present invention.
Figure 16:
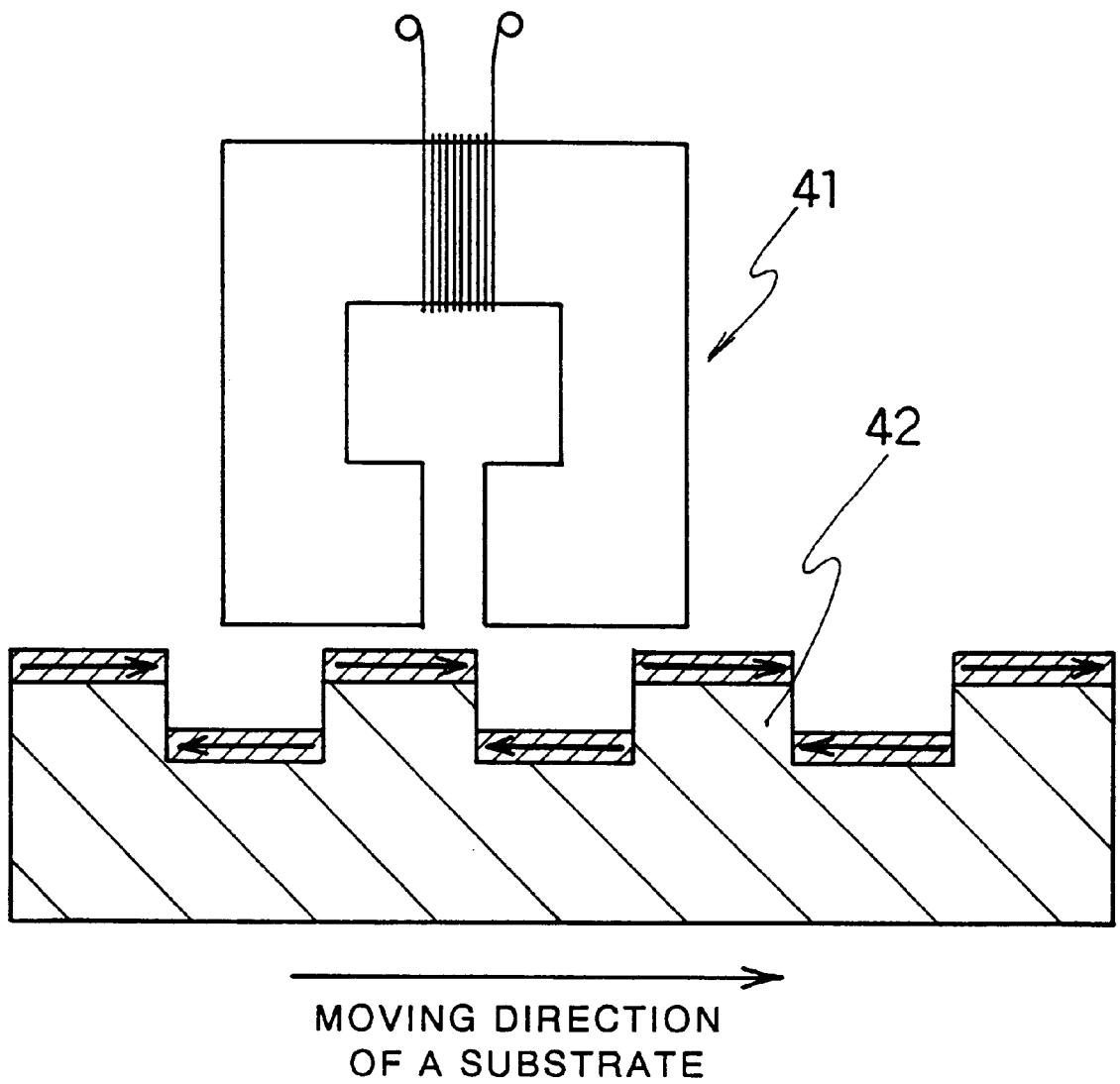
FIG. 16 is an explanatory view showing a conventional magnetically recording/reproducing method in which convex parts and concave parts are formed on the surface of magnetic recording medium.
Figure 17A:
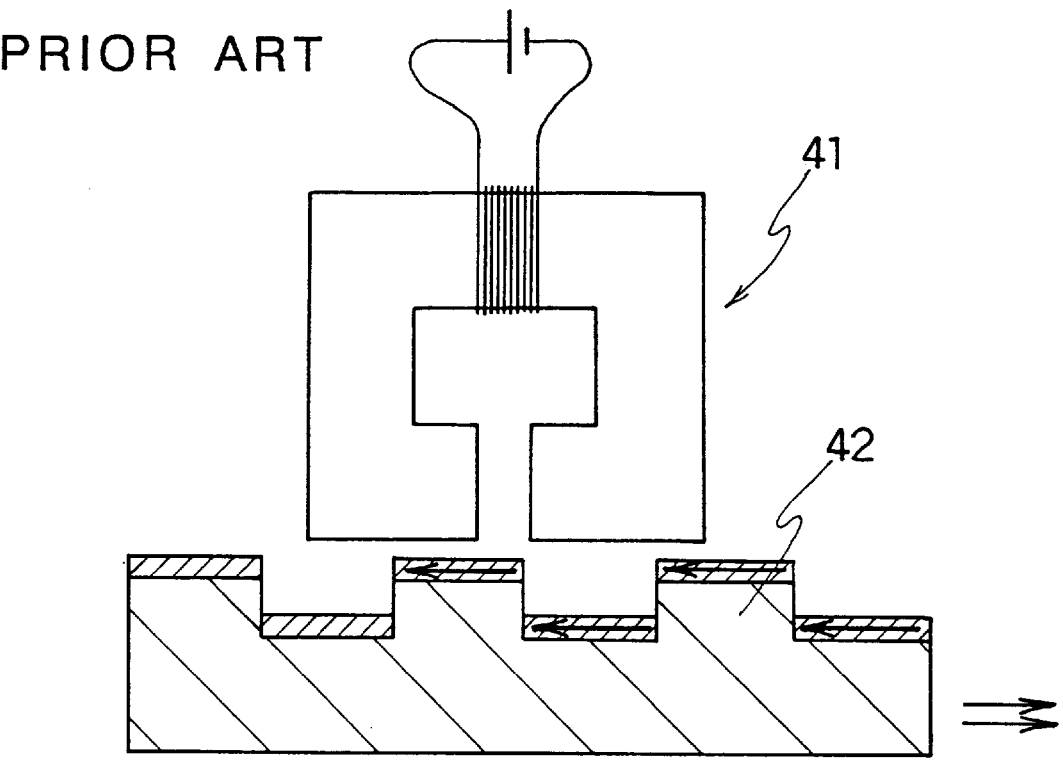
FIGS. 17(a) and 17(b) are each explanatory view illustrating a method for writing an information according to the method of FIG. 16.
Figure 17B:
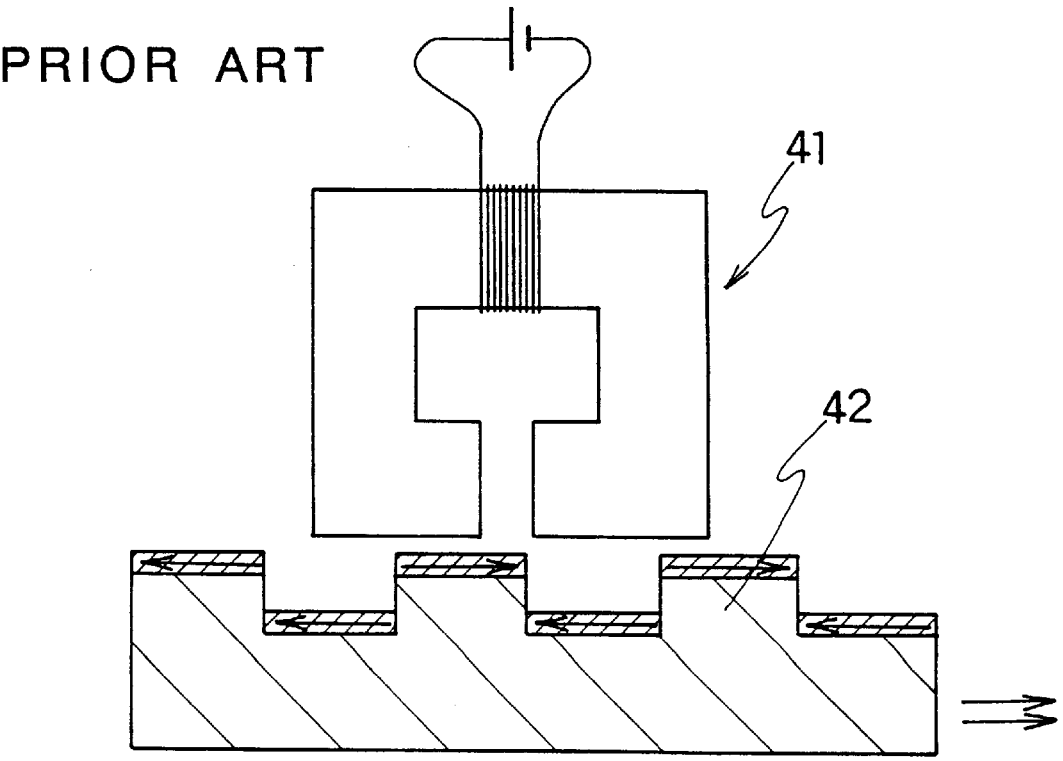
Figure 18:
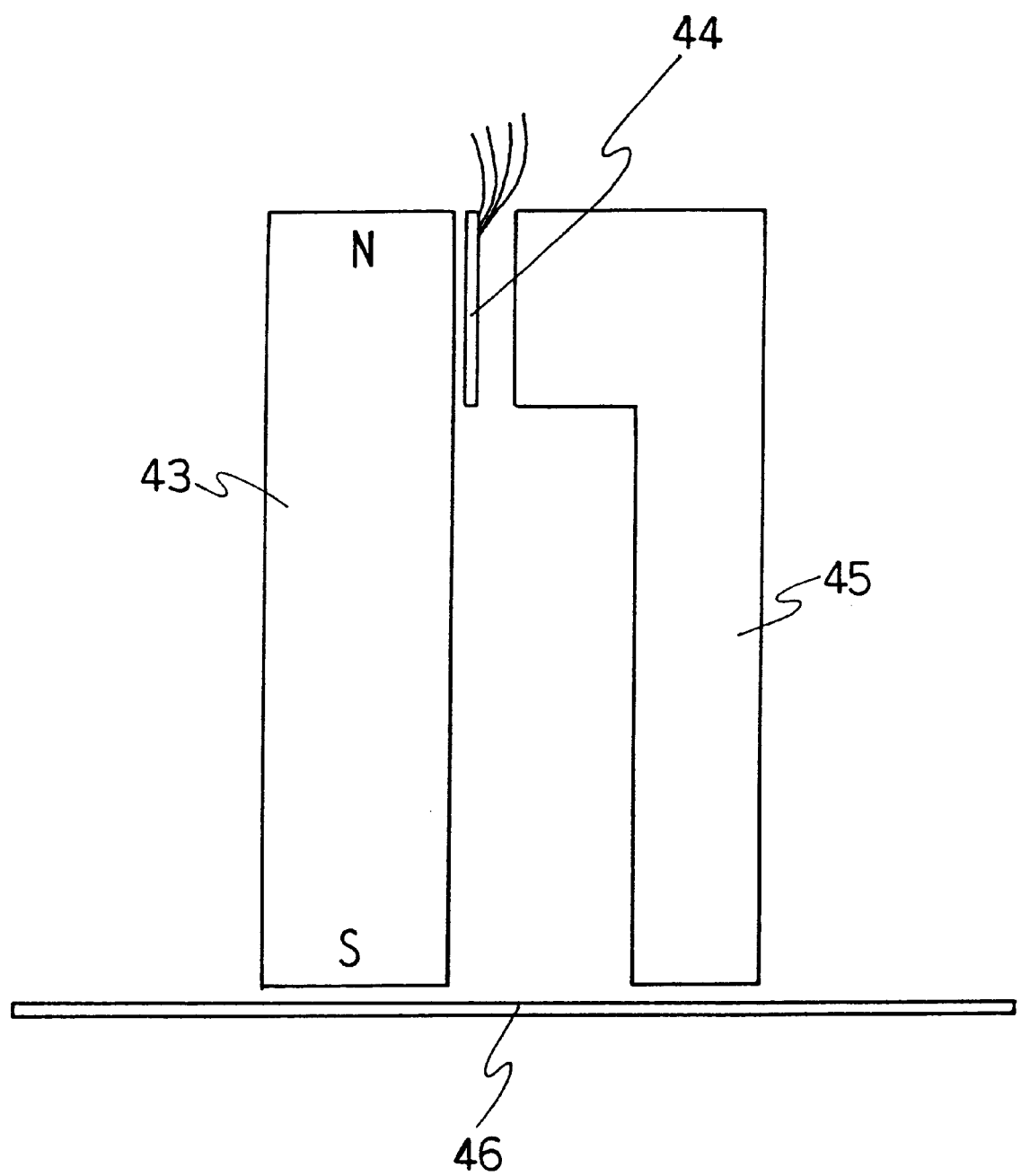
FIG. 18 is a conventional magnetically recording/reproducing method using a Hall element.

FIG. 15 is another example of magnetic reproducing apparatus of the present invention, in which the MR film employed in example 1 is arranged vertical to the magnetic recording medium 1. The other elements and operation are the same as example 1.

In accordance with the elements of example 9, the MR film 7 and the leads 8 can be formed on an identical surface, so that the reproducing apparatus can be, easily produced and assembled with low cost.

According to the magnetic recording/reproducing method of the present invention, information can be recorded by the patterns of the soft magnetic material. For that reason, copying of the magnetic recording medium can be mechanically mass-produced with low cost. Further, in accordance with the present invention, recording can be performed by the soft magnetic material, so that influence of erroneously cancelling due to external magnetic field can be avoided, and high reliability of the magnetic recording medium can be achieved.

Further, by virtue of the magnetoelectric converting element arranged in a place neighboring the magnetic recording medium, the patterns of the soft magnetic material are detected, so that fine patterns on the order of submicrons can be read by low magnetic field. For that reason, high density of information and precisely reproducing with small noise can be achieved.

As a result, ROM in which high density information is recorded can be commercially recorded/reproduced by magnetic device without any complicated apparatus such as an optical disc, a semiconductor memory.

According to the magnetic reproducing apparatus of the present invention, only the variation of the signal on both ends of the magnetoelectric converting element may be detected. Therefore, the applied voltage (or electric current) may be constant. For that reason, fine patterns can be precisely detected with the simple construction.

Further, according to the magnetic recording medium and producing method therefor of the present invention, recording of information can be performed by patterning of the soft magnetic material. For that reason, the pattern can be easily formed by forming a concave part and a convex part by means of stamping or press working, providing a soft magnetic material film on the substrate after forming the concave part and the convex part by injection moulding, or etching. The patterns can be mass-produced with low cost. Further, information of high density can be recorded, and cancelling of recorded information by the external magnetic field can be avoided.

Though several embodiments of the present invention are described above, it is to be understood that the present invention is not limited only to the above-mentioned, various changes and modifications may be made in the invention without departing from the spirit and scope thereof.

What is claimed is:

1. A magnetic recording medium wherein a pattern of soft magnetic material corresponding to an information signal is formed on a substrate and beneath and proximate to a flat exterior surface of said magnetic recording medium, wherein the presence or absence of said pattern relative to a direction normal to said surface and along a direction of recording defines said information signal, wherein said substrate is made of non-magnetic material.

2. The magnetic recording medium of claim 1, wherein said soft magnetic material positioned on a substrate is any one of a thin film provided on a surface of said substrate, fine particles stuck on said surface, a leaf of material and a bulk material.

3. The magnetic recording medium of claim 1, wherein said exterior surface of said substrate is formed of a protecting film made of a nonmagnetic material, with the exterior surface of said protecting film being made flat.

4. The magnetic recording medium of claim 1, wherein portions of said soft magnetic material are separated by portions of said non-magnetic material having no soft magnetic material formed thereon.

5. The magnetic recording medium of claim 4, wherein said portions of said soft-magnetic material lie on portions of said non-magnetic material which are closer to said surface relative to said portions of said non-magnetic material having no soft magnetic material formed thereon.

6. A magnetic recording medium wherein a pattern of soft magnetic material corresponding to an information signal is formed on a substrate and beneath and proximate to a flat exterior surface of said magnetic recording medium wherein a tracking servo pattern of a soft magnetic material corresponding to tracking servo signal other than said information signal is further formed.

7. A magnetic recording medium wherein a pattern of soft magnetic material corresponding to an information signal is formed on a substrate and beneath and proximate to a flat exterior surface of said magnetic recording medium, wherein the presence or absence of said pattern relative to a direction normal to said surface and along a direction of recording defines said information signal wherein said pattern is formed by concave and convex portions, said convex parts being located closer to said surface than said concave portions.

8. The magnetic recording medium of claim 7, wherein a distance of about 1 $\mu$m separates said concave portions from said convex portions in a direction normal to said surface.

* * * * *